(12) United States Patent
Noguchi et al.

(10) Patent No.: US 7,076,550 B1
(45) Date of Patent: Jul. 11, 2006

(54) NETWORK CONNECTION APPARATUS AND NETWORK SYSTEM USING THIS

(75) Inventors: Eiji Noguchi, Yokohama (JP); Jun Ozawa, Nara (JP); Satoshi Matsuura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 731 days.

(21) Appl. No.: 10/130,563

(22) PCT Filed: Nov. 17, 2000

(86) PCT No.: PCT/JP00/08148

§ 371 (c)(1),
(2), (4) Date: May 17, 2002

(87) PCT Pub. No.: WO01/37101

PCT Pub. Date: May 25, 2001

(30) Foreign Application Priority Data

Nov. 18, 1999 (JP) ................. 11/327996

(51) Int. Cl.
G06F 15/173 (2006.01)

(52) U.S. Cl. ....................... 709/225; 709/226
(58) Field of Classification Search ............ None
See application file for complete search history.

(56) References Cited

U.S. PATENT DOCUMENTS

| 5,761,399 A * | 6/1998 | Asano ............... 358/1.15 |
| 6,091,738 A * | 7/2000 | Tsujikado et al. ........... 370/453 |
| 6,167,449 A * | 12/2000 | Arnold et al. ........... 709/227 |
| 6,427,167 B1 * | 7/2002 | Siedel ............... 709/222 |
| 6,667,992 B1 * | 12/2003 | Yanagawa ............ 370/490 |
| 2005/0177651 A1 * | 8/2005 | Clark ............... 710/8 |

FOREIGN PATENT DOCUMENTS

| EP | 0 939 517 | 9/1999 |
| JP | 2-31538 | 2/1990 |
| JP | 7-271702 | 10/1995 |
| JP | 7-284164 | 10/1995 |
| JP | 7-284165 | 10/1995 |
| JP | 10-326244 | 12/1998 |
| JP | 11-88965 | 3/1999 |
| JP | 11-168498 | 6/1999 |
| WO | 99/07114 | 2/1999 |

* cited by examiner

*Primary Examiner*—John Follansbee
*Assistant Examiner*—Kenny Lin
(74) *Attorney, Agent, or Firm*—Hamre, Schumann, Mueller & Larson, P.C.

(57) ABSTRACT

A scanner (1) and a printer (2) each comprise a network interface unit (11/21) for transferring data with a network (7), an apparatus information interpretation unit (12/22) for interpreting information from other apparatuses, an apparatus information updating unit (13/23) for updating apparatus information based on this interpretation, and a functional information storing unit (14/24) for storing in advance functional information of its own apparatus. For example, when a new printer (2) is connected to a network (7) to which a scanner (1) is already connected, the printer (2) broadcasts functional information of its own apparatus stored in the function storing unit (14) by means of the network interface unit (21). The scanner (1) recognizes that a new apparatus has been connected and the functions of the new apparatus through the apparatus information interpretation unit (12) that interprets this information.

8 Claims, 34 Drawing Sheets

Function Definition Description of Printer

Function Definition Description of Scanner

```
<srdl>
  <service caption="copy">
    <item class="scan">
      <output Content-Type="image/$form">       ⎫
        <param att="width" val=$width/>          ⎬ Output Contents
        <param att="height" val=$height/>        ⎭
      </output>
    </item>
    <item class="print">
      <input Content-Type="image"/$form>         ⎫
        <param att="width" val=$width/>          ⎬ Input Contents
        <param att="height" val=$height/>        ⎭
      </input>
    </item>
  </service>
</srdl>
```

Service-Related Description of "copy"

FIG. 5

Function Definition Description of Hard Disk

Service-Related Description of "storing" Service

Function Definition Description of Gateway

Service-Related Description of "today's recipe"

```
<sdl>
  <item class="media" ui="recipe.uiml">
    <output Content-Type="text/html"/>
  </item>
</sdl>
```

Function Definition Description of Recipe Server

FIG. 17

```
<uiml>
  <select>
    <item onpick="152.158.0.1/itoyori.html">
      lemon-flavored itoyori</item>
  </select>
</uiml>
```

Function Definition Description of User
Interface of Recipe Server

FIG. 18

```
<?xml version="1.0" encoding="Shift_JIS" ?>
<!DOCTYPE recipe_system="recipe.dtd">
<print_image uri="http://www.menu.pana.co.jp"/>
<HTML>
<HEAD>
    <TITLE>lemon-flavored itoyori</TITLE>
    <STYLE TYPE ="text/css"/>
</HEAD>
<BODY>
<A href="itoyori/2nd_step.xml">put corbicula into bowl
,,,,</A>
</BODY>
</HTML>
```

Description of Recipe Contents

FIG. 19

```
⟨srdl⟩
   ⟨service caption="recipe printing"⟩
      ⟨item class="print"⟩
         ⟨input Content-Type="image/bmp"/⟩  ⎫ Input Contents
      ⟨/item⟩
   ⟨/sevice⟩
⟨/srdl⟩
```

Service-Related Description of "recipe printing"

FIG. 21

Lemon-flavored Itoyori

- Choose pink-colored fresh Itoyori.
- Smother with squeezed lemon juice, and the cuisine becomes more delicious!

 Ingredient
(for 3 persons)

| | |
|---|---|
| Itoyori | 3 small ones (about 450 g) |
| Corbicula | 2 cups (about 400 g) |
| Spinach | 200 g |
| A | 1/2 cups of white wine<br>1 cone pepper<br>1 fragment of sliced garlic |
| B | solt·pepper·butter,<br>in modest amounts |
| Squeezed lemon juice | 4 large spoons |

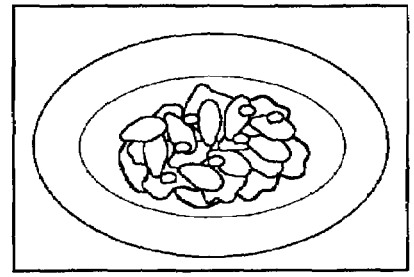

147kcal (for one person)

How to cook:
1. Put corbicula in a bowl, sprinkle A thereto and heat for 5 minutes at 600W with lidded.
2. Take out body and juice of corbicula.
3. Cut spinach in 3-4cm and warp them and heat for 2 minutes 30 seconds at 600W. Keep it in a bowl.
4. Pre-treat Itoyori to cut into three slices and put them on the above 3. Add B into this, sprinkle lemon juice and lid, followed by heating for 5 minutes 20 seconds at 600W. Sprinkle the above 2.

---

Shopping list for lemon-flavored Itoyori

- ☐ Itoyori     3 small ones
- ☐ Corbicula     400g
- ☐ Spinach
- ☐ White wine
- ☐ Cone pepper
- ☐ Garlic
- ☐ Lemon Copyright (C)1998 MATSUSHITA ELECTRIC INDUSTRIAL CO.,LTD

FIG. 23

Function Definition Description of Gateway

Function Definition Description of "fax"

```
<sdl>
    <item class="media" ui="dvd.uiml">          ⎫ Function
        <output Content-Type="video/mpeg">      ⎫
            <param att="width" val="640"/>      ⎬ Output Contents
            <param att="height" val="480"/      ⎭
        </output>
    </item>
</sdl>
```

Service Definition Description of DVD player

FIG. 30

```
<uiml>
    <icon img="192.168.3.2/dvd.icon">
    DVD
    </icon>
    <select>
        <item onpick="192.168.3.2/pretty-woman.mpg">
            pretty womon</item>
        <item onpick="192.168.3.2/die-hard.mpg">
            die hard</item>
    </select>
</uiml>
```

User Interface Definition Description of DVD player

FIG. 31

Example of Network Connection Apparatus
(Outlook : Television Set)

Specific Example of Network Connection Apparatus
(Outlook : Television Set)

Example of Network Connection Appatatus

Example of Network Connection Apparatus

Example of Address Solving Means

Example of Data Request Means in
The Network Connection Apparatus

Example of Network Connection Apparatus

NETWORK CONNECTION APPARATUS AND NETWORK SYSTEM USING THIS

CROSS REFERENCE TO RELATED APPLICATIONS

This application is a national stage of PCT application PCT/JP00/08148 filed Nov. 17, 2000.

TECHNICAL FIELD

The present invention relates to a network connection apparatus capable of providing services only by being connected directly to a network without the need for a server.

BACKGROUND ART

Recently, it has been considered to use household electrical appliances that are connected to a network such as the Internet. For instance, a microwave, etc. connected to the Internet and operable by downloading a recipe has appeared on the market. Such a trend is becoming more remarkable with the advent of the network era, and various kinds of household electrical appliances are being connected to a network via a telephone line, etc.

The standardization, etc. of a method for connecting various household electrical appliances has been considered by various standardization groups and the standardization of physical connection protocol for various household electrical appliances is carried out. However, the content of services actually provided and the format of data to be sent and received between household electrical appliances have not been decided and are dependent upon each equipment.

Furthermore, in the field of so-called white goods such as conventional home use cooking devices, a connection service via a network has not been considered because such goods basically operate and function as a product by itself.

Furthermore, conventionally, in order to realize a service through network connection, a device called a server for carrying out an integrated management was required. FIG. 45 shows an example of a conventional configuration. As shown in FIG. 45, a conventional network configuration necessarily includes a Lookup service server 703 for registering and managing the content of a service of each apparatus connected to a network 702. The Lookup service server 703 carries out collective management of various services and processing of registering and request etc. of new services.

When a service provider 700 for providing services is connected to a network 702, first, it broadcasts the content of services to be provided via the network 702. Thereby, the Lookup service server 703 registers the presence of the service provider 700 and the service content thereof.

When the service is requested by a client 701, the Lookup service server 703 introduces the service provider 700 for providing the requested service based on the registered service content. Thereby, the service receiver (the client 701) and the service provider (the service provider 700) are known to each other. As a result, the client 701 can receive the provided services by using the introduced service provider 700.

Furthermore, an enormous amount of information is present on the Internet and the absolute amount of information valuable for a user is increasing. Therefore, if the user uses the information on the Internet well, it is possible to obtain various kinds of interesting information efficiently. However, at the same time, since the amount of unnecessary information also is increasing, an information distribution system connecting the information sender (the service provider side) and the information receiver (the service user side) in good balance has been needed.

However, a network connection apparatus such as a conventional household electrical appliance or an audio equipment, etc. required a household integrated management system called a server, and operation, coordination, sensing, data collection, etc. were carried out collectively by this server.

Thus, conventional network connection apparatuses have a plurality of problems as follows because the server is required.

Firstly, since the apparatus called a server generally is constituted by a computer, etc., it is necessary to set a computer itself in advance. Furthermore, a new computer has to be set every time a new apparatus is added. Secondly, when the server is out of order, even if each apparatus is not out of order, the whole apparatus cannot operate, and thus the entire network apparatus cannot operate. Thirdly, power is not always supplied to household electrical appliances. When the power of the server is down, the network apparatus as a whole cannot operate.

Therefore, it is an object of the present invention to provide a network connection apparatuses capable of providing new services or functions only by being connected to a network without using an integrated management system called a server.

DISCLOSURE OF THE INVENTION

In order to achieve the above-mentioned object, a network connection apparatus according to the present invention is connected to the other network connection apparatus via a radio or a cable communication line to configure a network, including: an interface unit for sending and receiving data via the communication line; an apparatus information storing unit for storing information of its own apparatus; and an apparatus information interpretation unit for interpreting information of the other network connection apparatus received by the interface unit; wherein the network connection apparatus, when it is connected to the network, notifies the other network connection apparatus connected to the network of the information of its own apparatus stored in the apparatus information storing unit, via the interface unit.

According to this configuration, each network connection apparatus, when it is connected to the network, notifies the other network connection apparatus of the information of its own apparatus stored in the apparatus information storing unit. On the other hand, the other network connection apparatus receives the information from the newly connected network connection apparatus and interprets it, so that they can recognize that a new network connection apparatus is connected additionally to the network. Thus, it is possible to provide a network connection apparatus that can be interconnected to the other network connection apparatus only by connecting each network connection apparatus to a communication line.

In the above-mentioned network connection apparatus, it is preferable that the information of its own apparatus includes an apparatus identifier to be used by the apparatus of its own, and the apparatus information interpretation unit has an identifier interpretation unit for interpreting the apparatus identifier notified from the other network connection apparatuses.

According to this configuration, the network connection apparatus newly connected to the network notifies the other network connection apparatus of the apparatus identifier that the apparatus of its own uses, and the other network connection apparatuses interpret this apparatus identifier in the identifier interpretation unit of the apparatus information interpretation unit and thereby it can recognize the apparatus identifier of the newly connected network connection apparatus. Thus, without the need for a server, all the other apparatuses connected to the network can recognize the apparatus identifier of each network connection apparatus.

In the above-mentioned network connection apparatus, it is preferable that the network connection apparatus, when it is connected to the network, arbitrarily selects an apparatus identifier to be used by the apparatus of its own and sends it via the interface unit, and when the apparatus information interpretation unit judges that the apparatus identifier is not used by any other network connection apparatuses in the network, the apparatus identifier is determined to be an apparatus identifier of its own apparatus.

According to this configuration, without the need for a server, an apparatus newly connected to the network autonomously can select an apparatus identifier that is not used by the other network connection apparatuses.

In the above-mentioned network connection apparatus, it is preferable that the information of its own apparatus include function information of its own apparatus, and the apparatus information interpretation unit include a function interpretation unit for interpreting the function information of the other network connection apparatuses sent from the other network connection apparatuses.

According to this configuration, the apparatus newly connected to the network notifies the other network connection apparatuses of the function information of its own apparatus, and the other network connection apparatuses can recognize what function the newly connected network connection apparatus has by interpreting the function information in the function interpretation unit of the apparatus information interpretation unit. Thus, without the need for a server, all the other apparatuses connected to the network can recognize the function of each network connection apparatus.

It is preferable that the above-mentioned network connection apparatus further includes an information providing unit for providing information, wherein information of the service that the function interpretation unit judges to be providable based on the result of the interpretation of the function information from the other network connection apparatuses is provided by the information providing unit.

According to this configuration, the function interpretation unit of each network connection apparatus judges the providable service based on the function information from the other network connection apparatuses and provides the information of the service by the information providing unit. Thus, it is possible to judge autonomously the services that newly can be provided and to provide the same to a user.

In the above-mentioned network connection apparatus, it is preferable that the function information is defined by the input/output relationship of the network connection apparatus itself and the network.

According to this configuration, the function information of each network connection apparatus is defined by the input/output relationship of the network connection apparatus and the network, thereby each network connection apparatus recognizes the function of the other network connection apparatuses only from the viewpoint of what is input from the network and what is output to the network. In order to maintain the compatibility between the network connection apparatuses, it is sufficient that only this input/output relationship is recognized and it is not necessary to recognize the detailed attribution of each apparatus. Thus, it is possible to improve the compatibility of the network connection apparatuses and the expandability of the network.

In the above-mentioned network connection apparatus, it is preferable that the network connection apparatus further includes a service definition storing unit for storing the service definition information defining the service by the input/output relationship, wherein the function interpretation unit determines whether the combination of the input/output relationship of the function information of its own apparatus and the input/output relationship of the other network connection apparatuses matches to the input/output relationship of the service definition information, thereby determining whether the service can be provided.

According to this configuration, for example, it is shown that if a service in which contents $c_1$ are input and contents $c_3$ are output is defined as the input/output relationship of $c_1$ and $c_3$, a network connection apparatus having the input contents $c_1$ and the output contents $c_2$ can realize this service in cooperation with the other network connection apparatuses having the input contents $c_2$ and the output contents $c_3$. Thus, without the need for a server, each network connection apparatus can realize the cooperative service with the other network connection apparatuses autonomously.

In the above-mentioned network connection apparatus, it is preferable that the interface unit, the apparatus information unit and the apparatus information interpretation unit are hardware mounted on one semiconductor chip.

According to this configuration, since it is possible to connect each network connection apparatus by a chip having the same hardware configuration, the interconnecting property can be improved.

Furthermore, in order to achieve the above-mentioned object, a network system of the present invention includes a plurality of network connection apparatuses that are connected at any time via a radio or a cable communication line, wherein each network connection apparatus includes an interface unit for sending and receiving data via the communication line, an apparatus information storing unit for storing the information of its own apparatus and an apparatus information interpretation unit for interpreting information of the other network connection apparatus received by the interface unit; when one network connection apparatus is connected to the network system, the interface unit of the network connection apparatus notifies the other network connection apparatus previously connected to the network system of the information of its own apparatus stored in the apparatus information storing unit; and in the other network connection apparatus, the apparatus information interpretation unit interprets the notified information and recognizes that the one network connection apparatus is connected newly to the network system.

According to this configuration, when one network connection apparatus is connected newly to the network, this network connection apparatus notifies the other network connection apparatuses of the information of its own apparatus, while the other network connection apparatuses interpret the information from the newly connected network connection apparatus, and thereby recognize that a new network connection apparatus is connected additionally to the network. Thus, without the need for a server, by only connecting each network connection apparatus to a communication line, a network capable of interconnecting the network connection apparatuses can be provided.

In the above mentioned network system, it is preferable that the information of its own apparatus notified by the one network connection apparatus includes an apparatus identifier to be used by the apparatus, wherein in the other network connection apparatus, the apparatus information interpretation unit interprets the apparatus identifier sent from the one network connection apparatus, and thereby the apparatus identifier of the one network connection apparatus is recognized.

According to this configuration, the network connection apparatus newly connected to the network notifies the other network connection apparatuses of the apparatus identifier to be used by its own apparatus, and the other network connection apparatuses can recognize the apparatus identifier of the newly connected network connection apparatus by interpreting this apparatus identifier in the identifier interpretation unit of the apparatus information interpretation unit. Thus, without the need for a server, all the network connection apparatuses on the network can recognize the apparatus identifier of the newly connected network connection apparatus.

In the above-mentioned network system, it is preferable that in the one network connection apparatus, the interface unit arbitrarily selects an apparatus identifier to be used by the apparatus itself and sends the same, the other network connection apparatus, in the case where it uses the apparatus identifier, notifies the one network connection apparatus that the apparatus identifier is used, and when the one network connection apparatus does not receive the notification by any of the other network connection apparatus, the apparatus identifier is determined to be the apparatus identifier to be used by the apparatus itself.

According to this configuration, without the need for a server, it is possible to autonomously provide the apparatus that is a newly connected to the network with an apparatus identifier that is not used by the other network connection apparatuses.

In the above-mentioned network system, it is preferable that the information of its own apparatus notified by the one network apparatus includes the function information of its own apparatus, and in the other network connection apparatus, the apparatus information interpretation unit interprets the apparatus identifier sent from the one network connection apparatus, and thereby the apparatus identifier of the one network connection apparatus is recognized.

According to this configuration, the network connection apparatus newly connected to the network notifies the other network connection apparatuses of the function information of its own apparatus, and the other network connection apparatuses recognize what function this newly connected network connection apparatus has by interpreting this function information in the function interpretation unit in the apparatus information interpretation unit. Thus, without the need for a server, all the network connection apparatuses connected to the network can recognize the function of each of the connected network connection apparatuses.

In the above-mentioned network system, it is preferable that at least one of the network connection apparatuses includes an information providing unit for providing information, and information of the service that the function interpretation unit judges to be providable based on the result of the interpretation of the function information from the other network connection apparatus is provided by the information providing unit.

According to this configuration, the function interpretation unit of each network connection apparatus judges the service that can be provided based on the function information from the other network connection apparatuses, and provides the information of the service by the information providing unit. Thus, when a new network connection apparatus is connected, the service that can newly be provided, judged autonomously and provided to a user without the need for a server.

In the above-mentioned network system, it is preferable that the network connection apparatus having the information providing unit includes a user interface unit storing a unified format of a user interface and provides the content of the information notified by the other network connection apparatus in accordance with the unified format.

According to this configuration, even in the case where various network connection apparatuses are connected, it is possible to construct uniformly the interface for a user.

In the above-mentioned network system, it is preferable that the function information is defined by the input/output relationship of the network connection apparatus and the network system.

According to this configuration, since the function information of each network connection apparatus is defined by the input/output relationship of the network connection apparatus and the network, each network connection apparatus recognizes the function of the other network connection apparatuses only from the viewpoint of what is input from the network and what is output to the network. In order to maintain the compatibility between the network connection apparatuses, it is sufficient that only this input/output relationship is recognized and it is not necessary to recognize the detailed attribution of each apparatus. Thus, it is possible to improve the compatibility of the network connection apparatus and expandability of the network.

In the above-mentioned network system, it is preferable that at least one of the network connection apparatuses includes a service definition storing unit for storing the service definition information defining the service by the input/output relationship, wherein the function interpretation unit determines whether the combination of the input/output relationship of the function information of its own apparatus and the input/output relationship of the other network connection apparatuses matches to the input/output relationship of the service definition information, thereby determining whether the service can be provided.

According to this configuration, for example, it is shown that if a service in which contents $c_1$ are input and contents $c_3$ are output is defined as the input/output relationship of $c_1$ and $c_3$, a network connection apparatus having the input contents $c_1$ and the output contents $c_2$ can realize this service in cooperation with the other network connection apparatuses having the input contents $c_2$ and the output contents $c_3$. Thus, without the need for a server, each network connection apparatus can realize the cooperative service with the other network connection apparatuses autonomously.

In the above-mentioned network system, it is preferable that at least one of the network connection apparatuses includes an outside interface unit for exchanging data with an outside network, and network connection apparatus mediates the service provided by the outside network to the other connection apparatus.

According to this configuration, it is possible to use the service provided by the outside network.

In the above-mentioned network system, it is preferable that at least one of the network connection apparatuses includes the outside interface unit for exchanging data with an outside network, and the network connection apparatus searches necessary service in the outside network.

According to this configuration, it is possible to search and use the services provided in the outside network.

BRIEF DESCRIPTION OF DRAWINGS

FIG. 5 is a view to illustrate a service-related description of "copy" that is a cooperative service.

FIG. 17 is a view to illustrate an example of a function definition description of a recipe server.

FIG. 18 is a view to illustrate an example of a user interface definition description of a recipe server.

FIG. 19 is a view to illustrate an example of the content of a description of recipe contents.

FIG. 21 is a view to illustrate a service-related description of "recipe printing" that is a cooperative service.

FIG. 23 is a view to illustrate a print image of a recipe.

FIG. 30 is a view to illustrate an example of a function definition description of a DVD player.

FIG. 31 is a view to illustrate an example of a user interface definition description of a DVD player.

BEST MODE FOR CARRYING OUT THE INVENTION

Hereinafter, the embodiment according to the present invention will be explained with reference to drawings.

First Embodiment

The first embodiment of the present invention will be explained with reference to FIGS. 1 to 11.

In the first embodiment, a configuration and operation of three kinds of network connection apparatuses, that is, a scanner, a printer and a hard disk, will be explained as specific examples.

Figure 2:
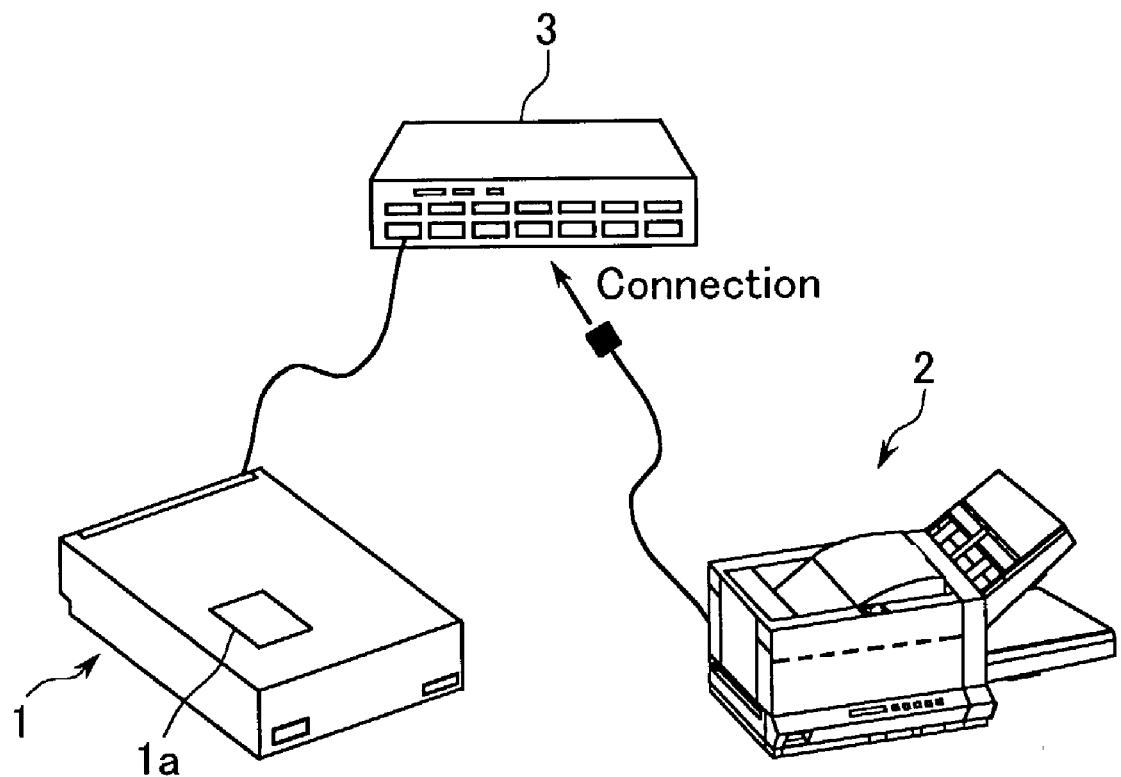
FIG. 2 is a view to illustrate a configuration of hardware of each of the network connection apparatus.

FIG. 2 is a view to illustrate an example of a configuration of hardware of a network connection apparatus according to this embodiment. Note here that FIG. 2 shows a state in which two network connection apparatuses (a scanner 1 and a printer 2) are connected to each other via a hub 3 for Ethernet connection. Moreover, a network is not shown in this figure. Furthermore, in this figure, the example in which two network apparatuses are connected to the same hub 3 is shown, but each network apparatus may be connected to a different hub.

The scanner 1 is used to read out an image from a paper, etc. The scanner 1 includes a liquid crystal panel 1a as an information display unit for displaying information to a user and a cable connected to the hub 3. The liquid crystal panel 1a is provided in a form of a touch panel, which receives an input from a user's fingers.

The printer 2 also has a cable connected to the hub 3. The printer 2 does not have an information display unit such as a liquid crystal panel 1a of the scanner 1.

Figure 1:
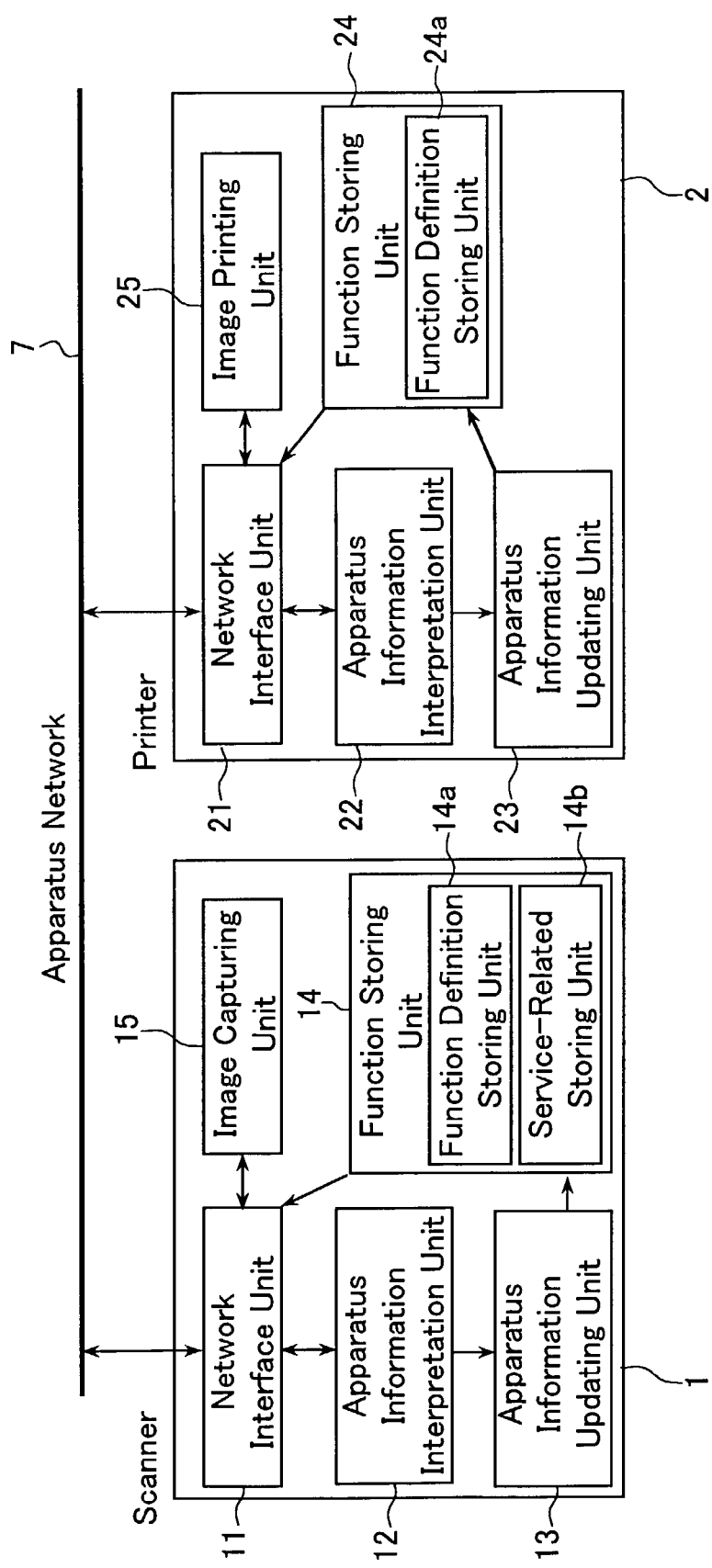
FIG. 1 is a block diagram showing a configuration of software of each network connection apparatus in a first embodiment of the present invention.

FIG. 1 shows a configuration of software existing in the hardware shown in FIG. 2.

As shown in FIG. 1, the scanner 1 includes a network interface unit 11, an apparatus information interpretation unit 12, an apparatus information updating unit 13, a function storing unit 14, and an image capturing unit 15. Moreover, the network interface unit, the apparatus information interpretation unit, the apparatus information updating unit and the function storing unit are provided in common in any network connection apparatuses according to this embodiment regardless of the kinds thereof.

The network interface unit 11 realizes a function as an interface between its own apparatus and the network. The apparatus information interpretation unit 12 interprets the information received by the network interface unit 11. The information updating portion 13 updates the apparatus information, etc. stored in the function storing unit 14 based on the information interpreted in the apparatus information interpretation unit 12.

The function storing unit 14 includes a function definition storing unit 14a that stores the function information (function definition description) of its own apparatus and a service-related storing unit 14b storing information (service-related description) relating to a cooperative service that can be provided in cooperation with the other apparatuses. Note here that the function definition storing unit is a block common in all the network connection apparatuses of the present invention. However, the service-related storing unit may be provided at least on the network connection apparatus having an information display unit (a liquid crystal panel, etc.).

The image capturing unit 15 is a block unique to the scanner 1 and realizes a function as reading out an image from a paper, etc.

The printer 2 includes a network interface unit 21, an apparatus information interpretation unit 22, an apparatus information updating unit 23, a function storing unit 24 and an image printing unit 25.

The network interface unit 21, the apparatus information interpretation unit 22, the apparatus information updating unit 23 and the function storing unit 24 are common configurations for the network connection apparatus of this embodiment, and have the same functions as those of the network interface unit 11, i.e. the apparatus information interpretation unit 12, the apparatus information updating unit 13 and the function storing unit 14. On the other hand, the image printing unit 25 is a block unique to the printer 2 and has a function for printing an image.

Hereinafter, the operation of these apparatuses will be explained.

First, as shown in FIG. 2, only the scanner 1 is connected to the network 7 via the hub 3. An apparatus unique ID (apparatus identifier) is assumed to be "192.168.0.1." In this state, the printer 2 is connected newly to the hub 3. When the printer 2 is connected, the apparatus unique ID of the printer 2 is undetermined.

(Step 1-1)

When the printer 2 is connected to the network 7 via the hub 3, the printer 2 has to obtain an apparatus unique ID of its own apparatus. Therefore, the printer 2 broadcasts an apparatus unique ID selected at random. When the broadcast that the apparatus unique ID is already used by the other apparatuses, the apparatus using this ID notifies the printer that the ID is already used.

In this case, the printer 2 selects a different apparatus unique ID and broadcasts it again. On the other hand, in the case where no responses come from any other apparatuses even after a lapse of a predetermined time, it is judged that the ID is not used, and thus the printer 2 determines the ID to be as the apparatus unique ID of its own apparatus.

For instance, if the printer 2 broadcasts the apparatus unique ID, "192.168.0.1," that is, the apparatus unique ID of the scanner 1, the scanner 1 notifies the printer 2 that it already uses this ID. Next, if the printer 2 broadcasts "192.168.0.2", since this ID is not yet used, there is no response from any other apparatuses, so that this ID is determined as the apparatus unique ID of the printer 2.

(Step 1-2)

After the printer 2 obtains the apparatus unique ID, it broadcasts the address of the file (a function definition storing unit 24a of the function storing unit 24) in which the function of the printer 2 is described previously, for example, "join 192.168.0.2 printer printer.sdl,"

in order to notify the other apparatuses connected to the network 7 of the function of its own apparatus. This indicates that the address of the function definition storing unit 24a in which the function of the printer 2 is described is "http://192.168.0.2/printer.sdl." FIG. 3 shows an example of the content.

Figure 3:
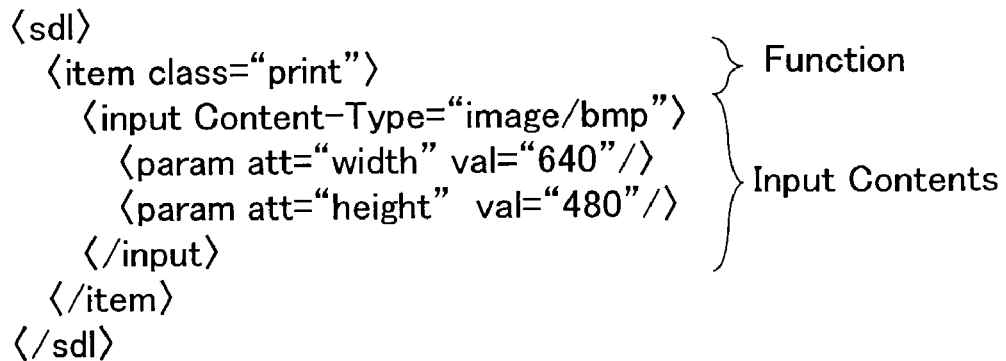
FIG. 3 is a view to illustrate an example of a function definition description of a printer.

As shown in FIG. 3, the function definition description representing the function of each network connection apparatus includes a portion in which the function name of the apparatus is described and a portion in which the content of the functions are described in terms of the input/output relationship with respect to the network 7 of the apparatus.

For instance, the function definition description of the printer 2 shown in FIG. 3 defines that the printer 2 has a function of "print" by the description:

item class="print."

This function is a function for converting electronic information into tangible information (paper, etc.). Note here that the tangible information means information that a human can perceive by its visual sense, auditory sense, etc.

Furthermore, in FIG. 3, this content of the function of "print" is defined by the description from <input> tag to </input> tag (input contents format). Namely, it is shown that the contents, which the printer 2 can input from the network 7 and process, have a "bmp" format and the size of "640*480."

Moreover, the input/output relationship described in the function definition description means an input content/output content with respect to the network 7. Namely, since the output contents of the printer 2 are produced on a paper medium but are not produced on the network 7, the output contents format is not included in the function definition description of the printer 2.

Therefore, the other network connection apparatuses connected to the network 7 are only notified that the printer 2 inputs a 640*480 bmp file and executes the function of "print" but are not notified that the output is produced on a paper medium.

Note here that if the function definition description is described in a MIME (Multipurpose Internet Mail Extension) format, the general versatility can be improved. Furthermore, in this embodiment, the example in which the function definition description is described in an XML format, however, it may be described in the other formats.

Herein, the example in which the address of the file storing the function definition description is broadcast is described, however, the function definition description itself (contents shown in FIG. 3) may be broadcast. However, it is advantageous to broadcast addresses from the viewpoint of reducing the load to the network.

(Step 1-3)

When the other apparatus (herein, the scanner 1) that is previously connected to the network 7 receives the broadcast from the printer 2 carried out in the step 1-2, it determines whether a new service can be provided to a user in cooperation with the newly connected apparatus (printer 2). In a case where it is possible to provide a new service, its content is displayed to a user. Hereinafter, details of the processing procedure are explained.

Figure 4:
FIG. 4 is a view to illustrate an example of a function definition description of a scanner.

When the content of the function definition description of the scanner 1 is as shown in FIG. 4, the function definition description shown in FIG. 4 indicates that the scanner 1 has a function of "scan" and outputs a file having a size of 640*480 and a bmp format. Note here that the "scan" function means a function for converting tangible information (paper, tangible image, tangible sound) into bmp format electronic information. Note here that when information is converted into a gif format, a jpeg format, etc., instead of the bmp format, the same definition can be carried out as shown in FIG. 4.

As mentioned above, the network connection apparatus having the information display unit previously stores the definition (service-related description) of the cooperative service that can be provided in cooperation with the other apparatuses. Therefore, the scanner 1 having the liquid crystal panel 1*a* as the information display unit stores a service-related description shown in FIG. 5 in the service-related storing unit 14*b* in the function storing unit 14.

As shown in FIG. 5, the service-related description previously defines the content of the cooperative service that can be realized in combination with the functions of a plurality of apparatuses in terms of the input/output relationship with respect to the network 7.

Specifically, the service-related description of FIG. 5 defines the content of the cooperative service of "copy." This cooperative service is defined by the combination of a "scan" function described in the format of the output contents from <item class="scan"> tag to the first </item> tag and a "print" function described in the format of the input contents from <item class="print"> tag to </item> tag.

That is, the cooperative service of "copy" is realized by the cooperation of the network apparatus outputting "image" to the network 7 and executing a "scan" function and the network apparatus into which "image" is input from the network 7 to execute "print" function. As shown in FIG. 5, the condition of the "copy" function is that the "image" format ($form) and its size ($width and $height), which are treated by these network apparatuses, are matching.

When the apparatus information interpretation unit 12 of the scanner 1 receives the broadcast from the printer 2, based on the service-related description, it determines whether it is possible to provide the "copy" service in cooperation with its own apparatus and the printer 2.

The apparatus information interpretation unit 12 of the scanner 1 judges that it is possible to provide the cooperative service of "copy" in the cooperation with the scanner 1 and the printer 2 based on the content broadcast from the printer 2 (see FIG. 3), the function definition description of its own apparatus (see FIG. 4) and the service-related description shown in FIG. 5. It is because the output contents of the function definition description of the scanner 1 matches to the output contents in the service-related description of FIG. 5 (see FIG. 4) and the input content of the function definition description of the printer 2 matches to the input content (see FIG. 3).

Like this, when the printer 2 is connected additionally to the network 7 to which the scanner 1 is connected, thus enabling a new service of "copy" to be provided to a user in which the scanner 1 converts the paper information into the electronic information ("bmp" format, size: "640*480") and outputs it to the network and then the printer 2 accepts the electronic information from the network 7 and converts it into paper information.

Figure 6:
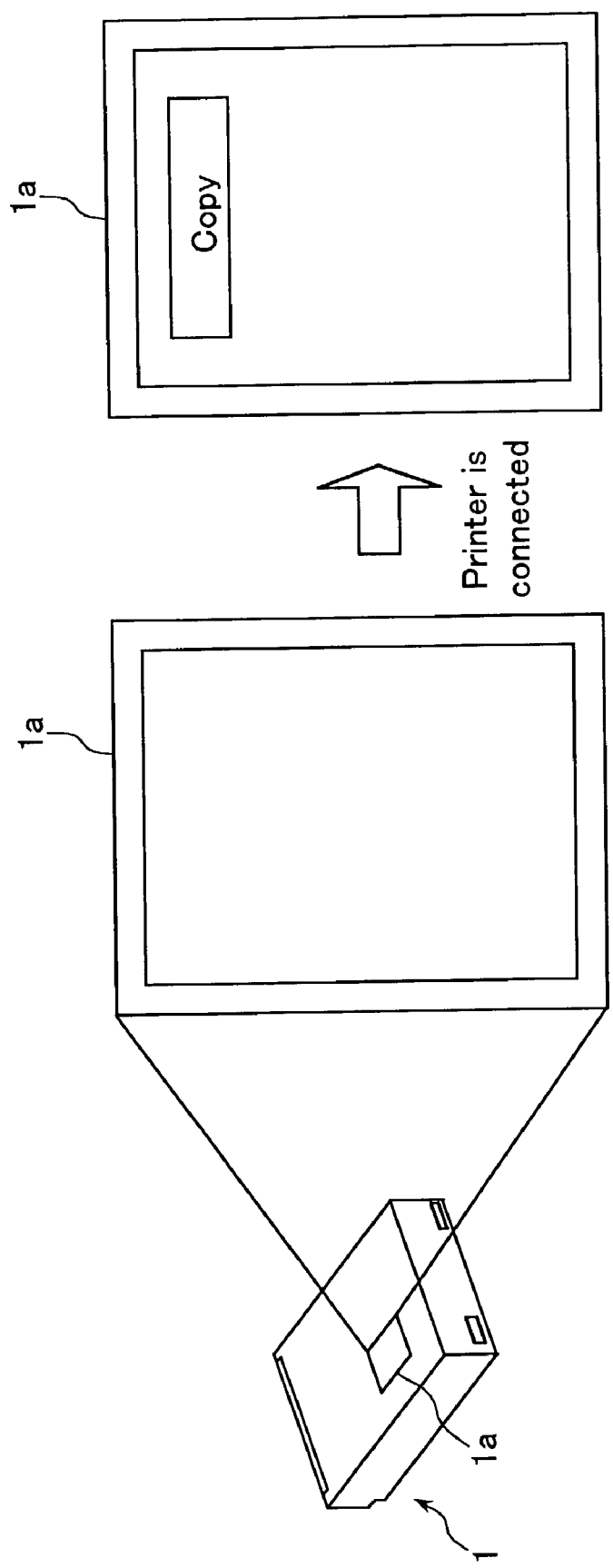
FIG. 6 is a view to illustrate a change in a display state of a liquid crystal panel of a scanner when a printer is connected.

At this time, the apparatus information updating unit 13 of the scanner 1 updates the apparatus information of the function storing unit 14. Thereby, the liquid crystal panel 1*a* of the scanner 1 displays the name of the service, "copy", based on the updated apparatus information as shown in FIG. 6. Thus, a user can recognize that copying is possible.

Note here that if the apparatus that cannot provide a new service even if it uses the function of the printer 2 is connected to the network 7 other than the scanner 1, no change occurs in the apparatus even if it recognizes the content broadcast by the printer 2.

(Step 1-4)

Figure 7:
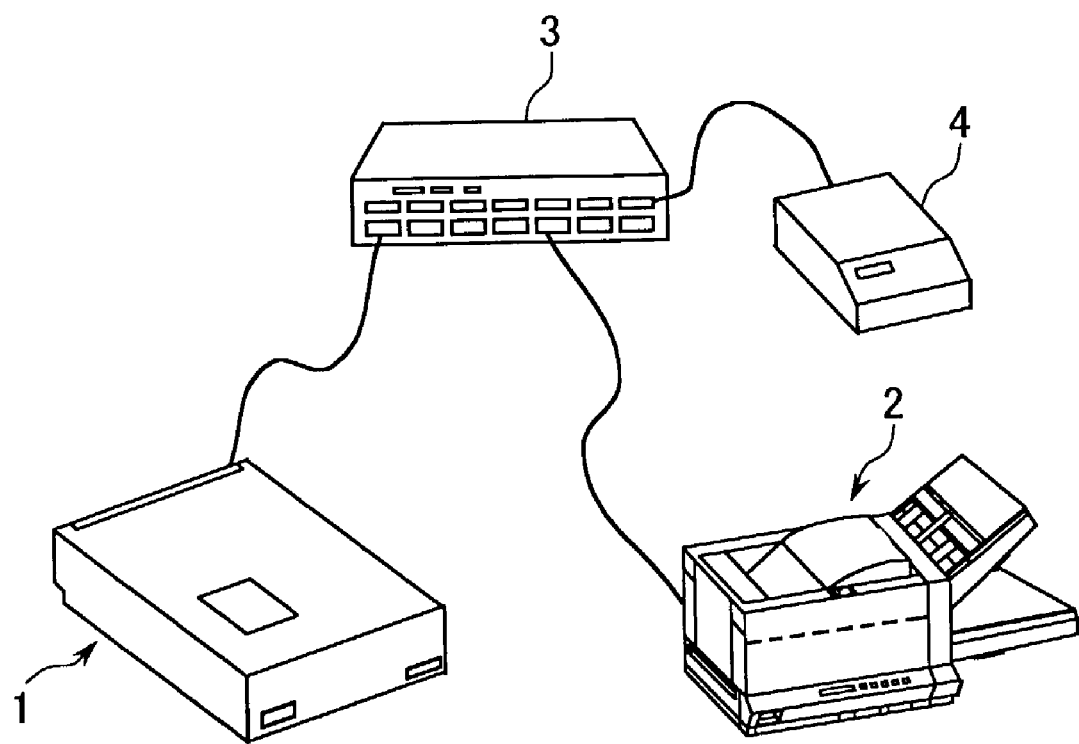
FIG. 7 is a view to illustrate a configuration of hardware when a hard disk is connected additionally to the configuration shown in FIG. 2.

The following is a case where a hard disk 4 is connected additionally to the network to which the scanner 1 and the printer 2 are connected as shown in FIG. 7.

Figure 8:
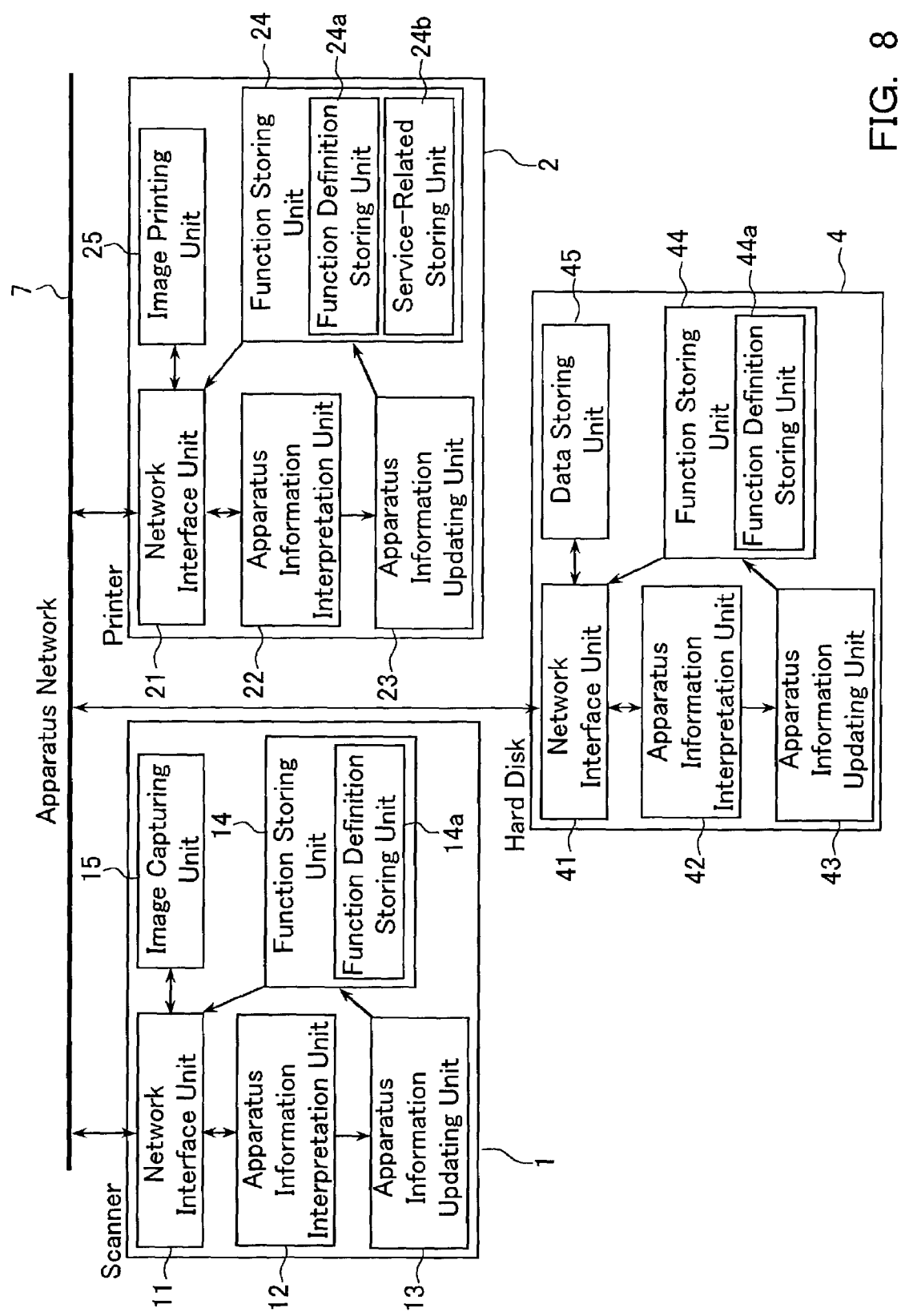
FIG. 8 is a block diagram showing a configuration of software of each network connection apparatus shown in FIG. 7.

FIG. 8 shows the system configuration at this time. As shown in FIG. 8, the hard disk 4 includes a network interface unit 41, an apparatus information interpretation unit 42, an apparatus information updating unit 43, a function storing unit 44 and a data storing unit 45.

As mentioned above, the network interface unit 41, the apparatus information interpretation unit 42, the apparatus information updating unit 43 and the function storing unit 44 are configurations common in the network connection apparatus of this embodiment and have the same functions as those of the network interface unit 11, the apparatus information interpretation unit 12, the apparatus information updating unit 13 and the function storing unit 14. On the other hand, the data storing unit 45 is a block unique to the hard disk 4 and realizes the function for storing data.

Figure 9:
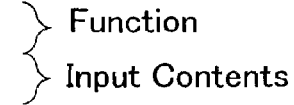
FIG. 9 is a view to illustrate one example of a function definition description of a hard disk.

In the function storing portion 44 of the hard disk 4, in the function definition storing portion 44*a*, the function definition description shown in FIG. 9 is stored. This function definition description defines that the hard disk 4 has a function of "store" for storing data and receives an image as an input contents.

Herein, when the hard disk 4 is connected to the network 7, similar to the case where the printer 2 is connected additionally in the step 1-2, a message having the content:

"join 192.168.0.3 hdd hdd.sdl"

is broadcast. As in the step 1-2, this indicates that the function of the hard disk 4 is described in "http://192.168.0.3/hdd.sdl."

(Step 1-5)

Similar to the step 1-3, the scanner 1 and the printer 2, which have been connected to the network 7 previously, determine whether a new cooperative service can be provided with respect to the broadcast content.

Now here that the scanner 1 is assumed to have a service-related description, in which the content of the cooperative service: "store in disk," is described, in the service-related storing unit 14b of the function storing unit 14 as shown in FIG. 10.

Figure 10:
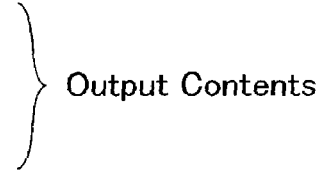
FIG. 10 is a view to illustrate a service-related description of "storing" that is a cooperative service.

As is apparent from FIG. 4, the function definition description of the scanner 1 matches to the output contents of the service-related description shown in FIG. 10. Furthermore, as is apparent from FIG. 9, the function definition description of the hard disk 4 matches the input contents of the service-related description shown in FIG. 10. Therefore, the apparatus information interpretation unit 12 of the scanner 1 judges that it is possible to provide a new service of "store in disk" in cooperation with the scanner 1 and the hard disk 4 that is connected newly to the network.

Figure 11:
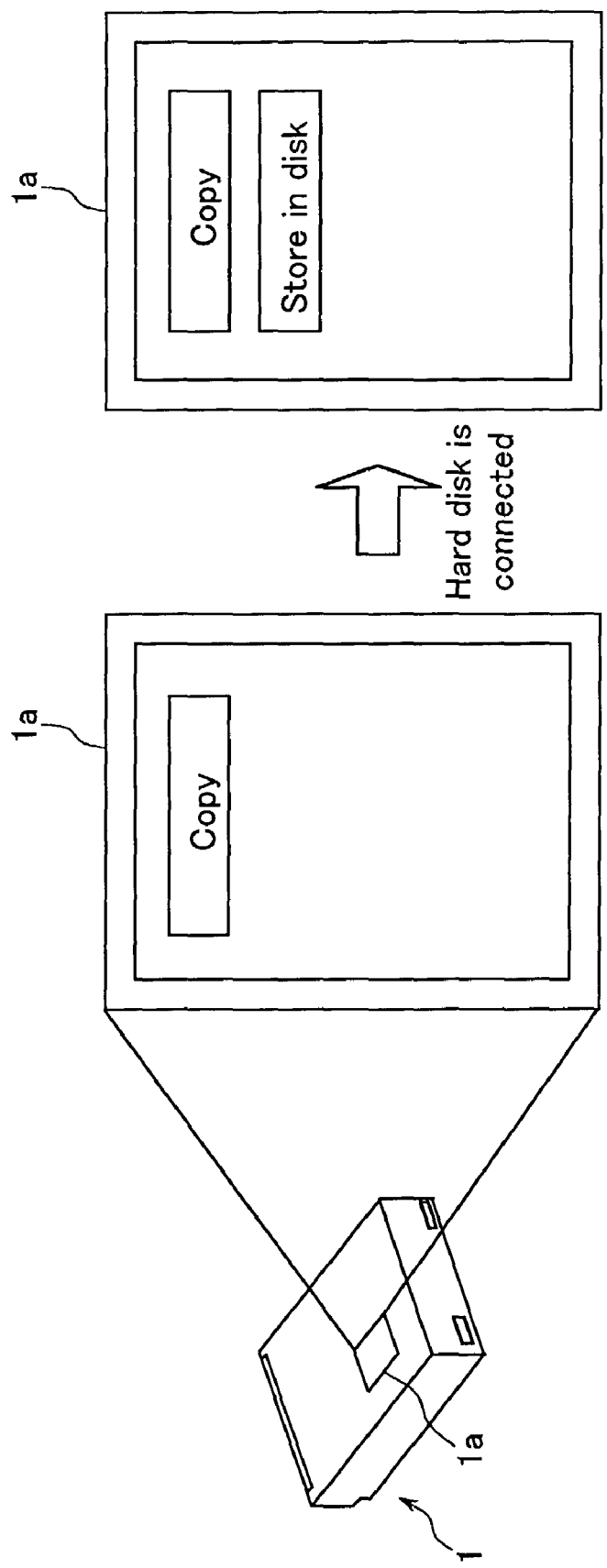
FIG. 11 is a view to illustrate a change in a display state of a liquid crystal panel of a scanner when a hard disk is connected additionally.

Then, the apparatus information updating unit 13 of the scanner 1 updates the apparatus information of the function storing unit 14, and the liquid crystal panel 1a additionally displays a button menu of "store in disk" based on the updated apparatus information as shown in FIG. 11.

(Step 1-6)

Herein, in a system in which the scanner 1, the printer 2 and the hard disk 4 are connected to the network via the hub 3 as shown in FIG. 7, a user selects "copy" in the liquid crystal panel 1a shown in FIG. 11 and inserts a paper on which an image to be copied is printed into the scanner 1 to operate it.

At this time, the scanner 1 reads out the image from the paper and forms a 640*480 bmp format file as described in the function definition description of FIG. 4. Then, since it is known in the step 1-2 that the apparatus having a "print" function is connected to the address of "192.168.0.2", the scanner 1 sends a bmp file to the address "192.168.0.2."

Thus, it is sufficient that the network connection apparatuses of this embodiment recognize the other apparatuses only in terms of the input/output relationship, but it is not necessary to recognize the specific attributes of the other apparatuses.

Furthermore, when a user selects "store in disk" in the liquid crystal panel 1a of FIG. 11, and further inserts a paper on which the data to be electrically stored into the scanner 1 is printed and operates it, similar to the above-mentioned service of "print," the tangible information (image etc.) is read out by the scanner 1, converted into electronic information, sent to the hard disk 4 and stored in the file.

Also in this case, it is sufficient that the scanner 1 recognizes that the apparatus having a function for electrically storing information exists in "192.168.0.3" and it is not necessary to recognize the specific attributes of the apparatus. That is, the scanner 1 does not need to recognize that the media in which the information is to be stored is a hard disk or a tape medium, etc. Therefore, in the case where the new type of storage media appears in the future, if a function is the same, compatibility can be realized.

Moreover, in this embodiment, as an apparatus for capturing an image, the scanner was mentioned as an example. However, any other apparatuses capable of converting the image information into the electronic data, for example, an electron still camera, etc. can be employed instead of the scanner.

In this embodiment, as the apparatus for printing out the electronic data, the printer was mentioned as an example. However, an apparatus such as a facsimile machine may be used.

Moreover, in this embodiment, as an apparatus capable of storing data, the hard disk was mentioned as an example. However, any arbitrary apparatus capable of electrically storing data, for example, DVD-RAM, a semiconductor memory card, etc., can be employed.

Second Embodiment

The second embodiment of the present invention will be explained with reference to FIGS. 12 to 23.

In this embodiment, a configuration and operation of two kinds of network connection apparatuses, that is, a cooking microwave and a gateway, will be explained as specific examples.

Figure 12:
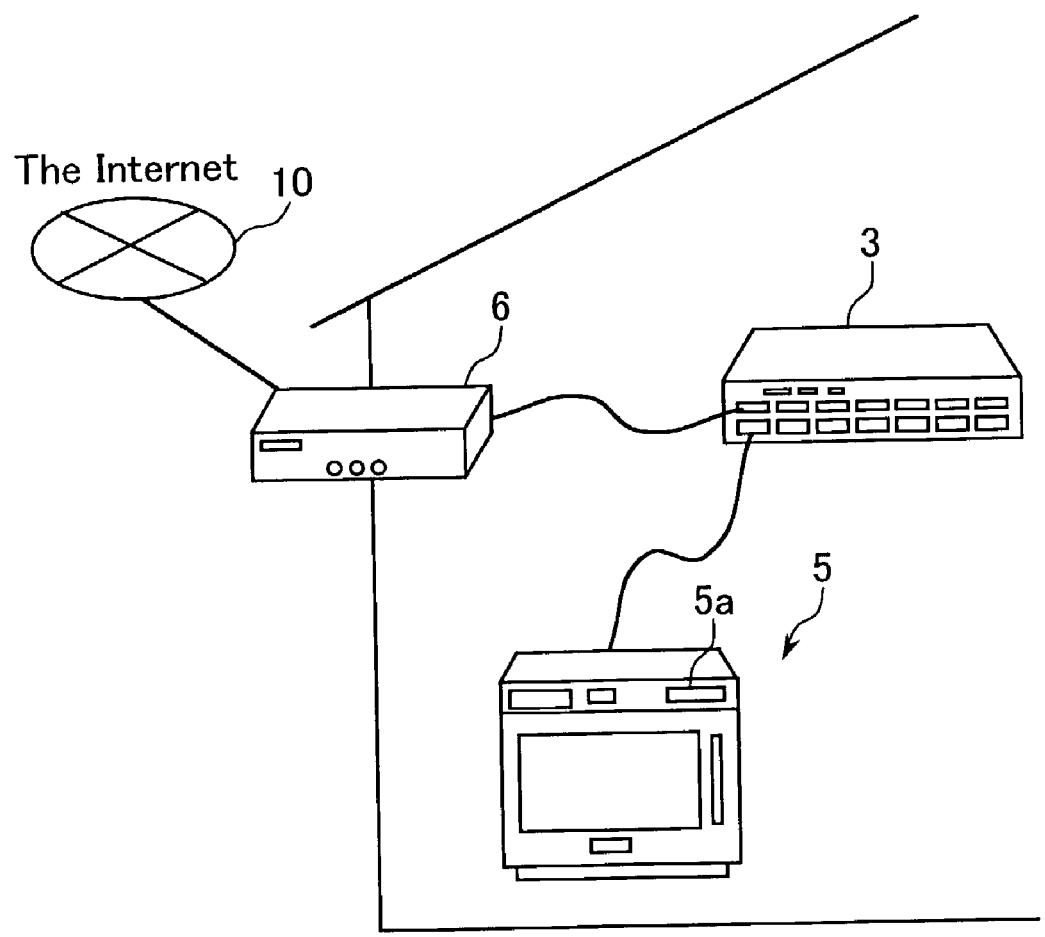
FIG. 12 is a block diagram showing a configuration of hardware of each network connection apparatus in a second embodiment of the present invention.

FIG. 12 is a view to illustrate an example of a configuration of hardware of the network connection apparatus according to this embodiment.

In FIG. 12, a cooking microwave 5 capable of being connected to a network is connected to a hub 3 capable of Ethernet connection via a cable. The microwave 5 includes a liquid crystal panel 5a capable of displaying information and at the same time functioning as a touch panel. Furthermore, also a gateway 6 connecting between an outside network 10 such as the Internet to a home network is connected to the hub 3 via the cable.

Figure 13:
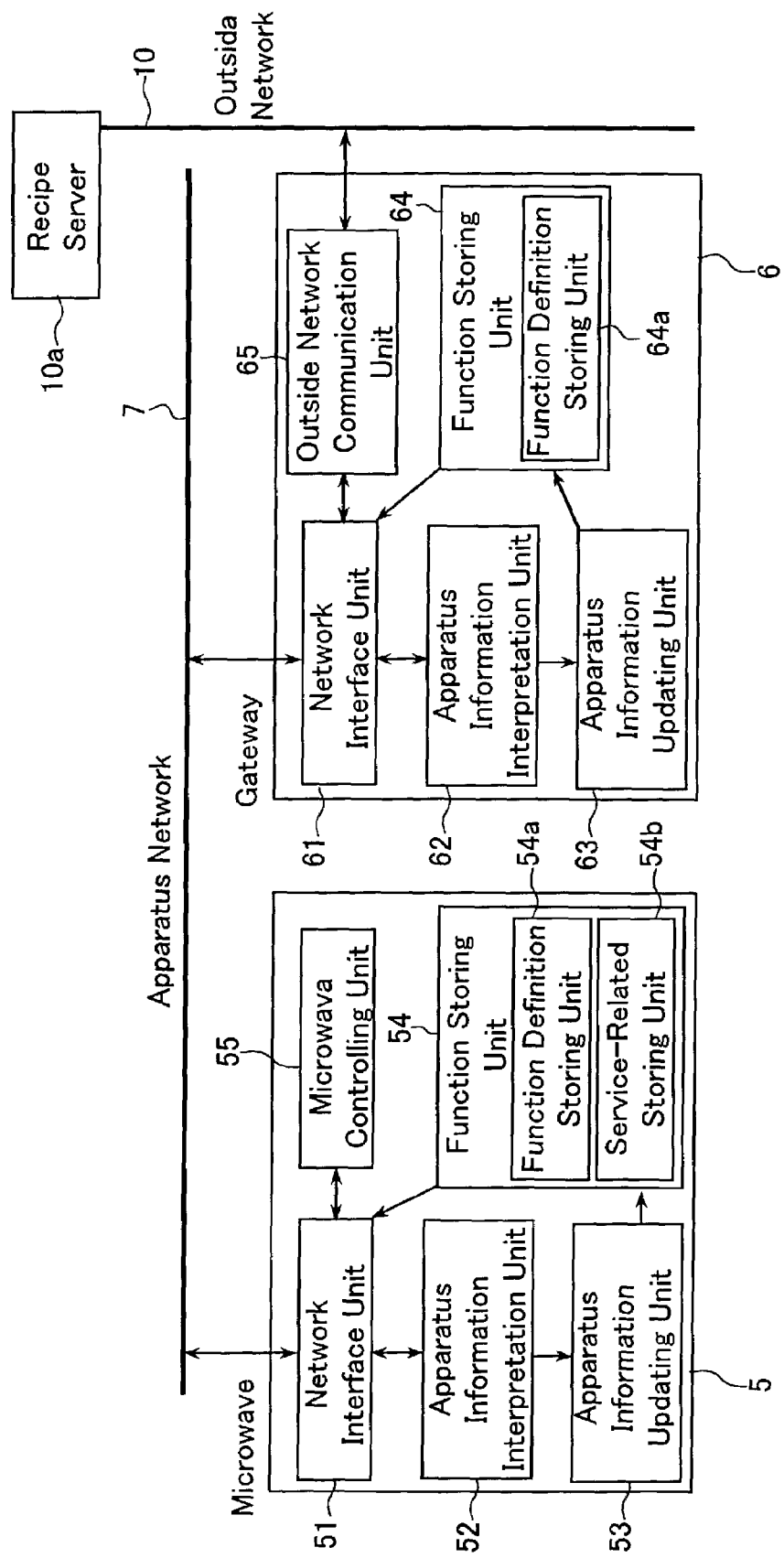
FIG. 13 is a view to illustrate a configuration of software of each of the network connection apparatus.

FIG. 13 shows a configuration of software existing in the hardware shown in FIG. 12.

As shown in FIG. 13, the microwave 5 includes a network interface unit 51, an apparatus information interpretation unit 52, an apparatus information updating unit 53, a function storing unit 54 and a microwave controlling unit 55.

The network interface unit 51, the apparatus information interpretation unit 52, the apparatus information updating unit 53 and the function storing unit 54 have the same functions as those of the network interface unit 11, the apparatus information interpretation unit 12, the apparatus information updating unit 13 and the function storing unit 14 of the scanner 1 explained in the first embodiment. On the other hand, the microwave controlling unit 55 is a block unique to the microwave 5 and realizes a function for cooking by heat, etc. using electromagnetic wave, etc.

Furthermore, the gateway 6 also includes a network interface unit 61, an apparatus information interpretation unit 62, an apparatus information updating unit 63 and a function storing unit 64, and at the same time has the outside network communication unit 65 as a block unique to the gateway 6. The outside network communication unit 65 has a function for connecting the network 7 that is a home network to the outside network 10 such as the Internet.

On the outside network 10, there is a recipe server 10a in which recipes for microwave are stored. If the outside network 10 is the Internet, a user can access the recipe server 10a via http.

The following is an explanation of an operation in the case where the gateway 6 is connected additionally to the network 7 to which only the microwave 5 is connected in advance.

(Step 2-1)

The gateway 6 newly connected to the network 7 that is a home network obtains a new apparatus unique ID in the network 7 as in the case explained in the step 1-1 of the first embodiment of the present invention. Herein, the apparatus unique ID of the microwave 5 is "192.168.1.1" and the newly connected gateway 6 is assumed to obtain an apparatus unique ID, "192.168.1.2."

(Step 2-2)

At the same time the gateway 6 is connected, similar to the step 1-2 of the first embodiment, it broadcasts the content:

"join 192.168.1.2 gateway gateway.sdl"

to the network 7 in order to notify the other apparatuses on the network 7 of the function of its own apparatus. This indicates that the function of the gateway 6 is described in "http://192.168.1.2/gateway.sdl".

Figure 14:
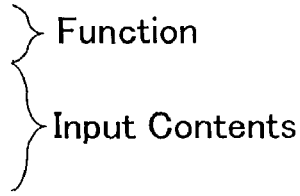
FIG. 14 is a view to illustrate an example of a function definition description of a gateway.

Herein, FIG. 14 shows an example of the description content of "gateway.sdl." The function definition description shown in FIG. 14 defines that the gateway 6 has a function of "send" for sending electronic data and is capable of communicating under the protocol of SMTP.

(Step 2-3)

The microwave 5 recognizes that an apparatus having a function of "send" shown in FIG. 14 is connected to the network 7 when the apparatus information interpretation unit 52 interprets the broadcast from the gateway 6.

Figure 15:
FIG. 15 is a view to illustrate a service-related description of "today's recipe" that is a cooperative service.

Moreover, the service-related storing portion 54b of the function storing unit 54 in the microwave 5, as shown in FIG. 15, previously defines as the service-related description that when the apparatus having a function of "send" under the protocol of SMTP is connected newly to the network, a new service of "today's recipe" can be realized in cooperation with this apparatus.

Figure 16:
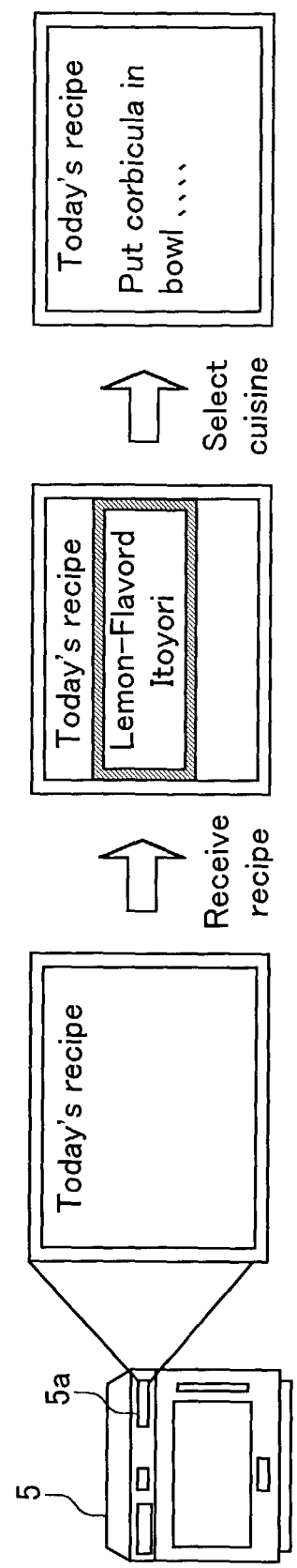
FIG. 16 is a view to illustrate a change in a display state of a liquid crystal panel of a microwave when the service of "today's recipe" is provided.

Herein, since the function definition description of the gateway 6 shown in FIG. 14 matches the input contents in the service-related description of FIG. 15, the apparatus information interpretation unit 52 of the microwave 5 judges that it is possible to provide a service of "today's recipe" in cooperation with the gateway 6. Herein, the apparatus information updating unit 53 updates the apparatus information of the apparatus storing unit 54, and the liquid crystal panel 5a displays a button menu of "today's recipe" based on the updated apparatus information as shown in FIG. 16.

At the same time the "today's recipe" is displayed in the microwave 5, the microwave 5 sends a message for requesting the function definition description of the recipe server with respect to a predetermined address "menu@pana.co.jp" (recipe server) via the gateway 6. The microwave 5 previously recognized that this mail address is an address of the recipe server 10a. In the gateway 6, when the network interface unit 61 receives this mail, it sends an electronic mail to the recipe server 10a via the outside network communication unit 65.

When the recipe server 10a receives this message, it replies the message:

"join 152.158.0.1 menuserver menuserver.sdl"

to a sender (gateway 6 in this case) of the above-mentioned electronic mail. This notifies that the function definition description of the recipe server 10a is described in "menuserver.sdl" of the outside IP address "152.158.0.1" and the service can be utilized. However, the IP of the mail address in the recipe server does not necessarily match the address of the function definition description.

The gateway 6, instead of the recipe server 10a, broadcasts the content of the function definition description sent from the recipe server 10a to the apparatuses connected to a home network (network 7). Thus, the household appliances connected to the network 7 in home can recognize the contents services that can be used via the gateway 6.

Hereinafter, each household appliance connected to the network 7 accesses "http://152.158.0.1/menuserver.sdl" in which the function of the recipe server 10a outside is stored via the gateway 6. That is, when the access request is generated to "152.158.0.1" from each household appliance, the gateways 6 instead access the recipe server 10a.

Herein, FIG. 17 shows the content of "menuserver.sdl." In FIG. 17, item class="media" indicates that the recipe server 10a has a function for providing the contents (media). Furthermore, it is defined that the contents are described in an HTML text format. Furthermore, it is defined that the user interface definition description is described in "recipe.uiml."

(Step 2-4)

In the step 2-3, the microwave 5 receives the contents broadcast by the gateway 6 and the apparatus connected to the network 7 (the microwave 5 in this case) accesses an IP address "152.158.0.1" and obtains the service content of the recipe server 10a.

As shown in FIG. 17, it is recognized that the contents of HTML are stored in the recipe server 10a. Furthermore, since a part of the functions of HTML can be displayed, the microwave 5 obtains a user interface definition for displaying the recipe contents from the outside server. Moreover, this user interface definition is described in "http://152.158.0.1/recipe.uiml" as shown in FIG. 17.

Herein, FIG. 18 shows the content of the user interface definition When the apparatus information interpretation unit 52 of the microwave 5 interprets the contents shown in FIG. 18, the apparatus information updating unit 53 displays a button menu of "lemon-flavored Itoyori (Nemipteridae)" below the button menu of "today's recipe" as shown in FIG. 16.

(Step 2-5)

Furthermore, when a user selects "lemon-flavored Itoyori" in the liquid display panel 5a, the microwave 5 displays the content of the recipe provided by the gateway 6 step by step on the liquid crystal panel 5a.

The recipe contents are expressed in the HTML format as shown in FIG. 19. Note here that the recipe contents are not necessarily expressed in the HTML format and may be described in an XML format. Furthermore, the cooking procedures, for example, "put corbicula in a bowl . . . ," etc. may be in a text format. However, the description format of the cooking procedures is not necessarily limited to the text format. It may be possible to provide recipe contents using an image, etc. if there is room in the size, resolution, or the like, of the liquid crystal panel 5a of the microwave 5.

Furthermore, the recipe contents shown in FIG. 19 show only the first one step of the procedure for cooking "lemon-flavored Itoyori." When a user selects a "Next" button etc. in the liquid crystal panel 5a, the HTML file in which the next step is described is obtained from the gateway 6. However, the recipe contents are not necessarily described step by step like this, and all the contents of the recipes may be described in one file.

Furthermore, in the cooking procedure, in a step in which the microwave 5 carries out heating etc., the microwave controlling unit 55 carries out the output controlling of the microwave 5 or the controlling of heating time, as indicated in the recipe contents.

(Step 2-6)

Figure 20:
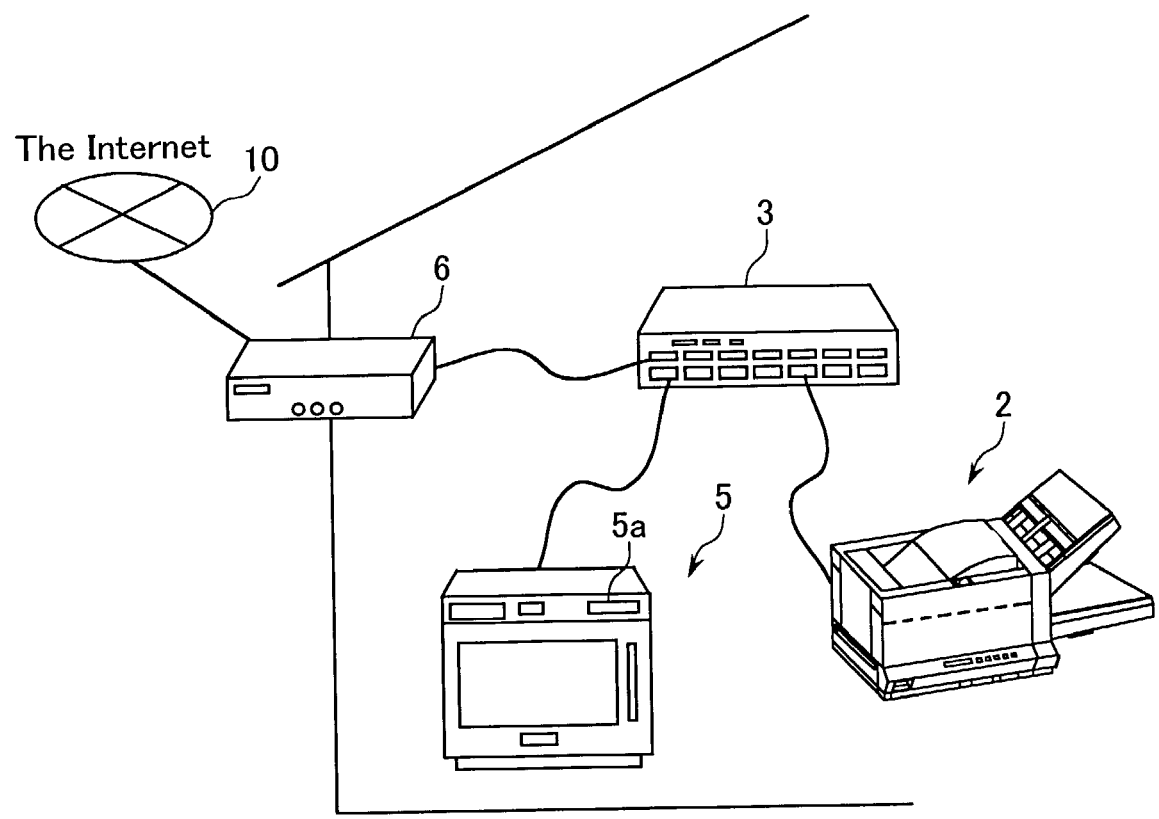
FIG. 20 is a view to illustrate the configuration of hardware when the printer is connected additionally to the configuration shown in FIG. 12.

Herein, as shown in FIG. 20, the printer 2 is connected additionally to the network 7. When the printer 2 is connected to the hub 3, as explained in the step 1-1 and the step 1-2, the printer 2 obtains an apparatus unique ID and broadcasts the function of its own apparatus.

(Step 2-7)

When the content broadcast by the printer 2 reaches the microwave 5 and the gateway 6, no change occurs in the gateway 6 because there is no new service that becomes possible in cooperation with the function of the printer 2.

Figure 22:
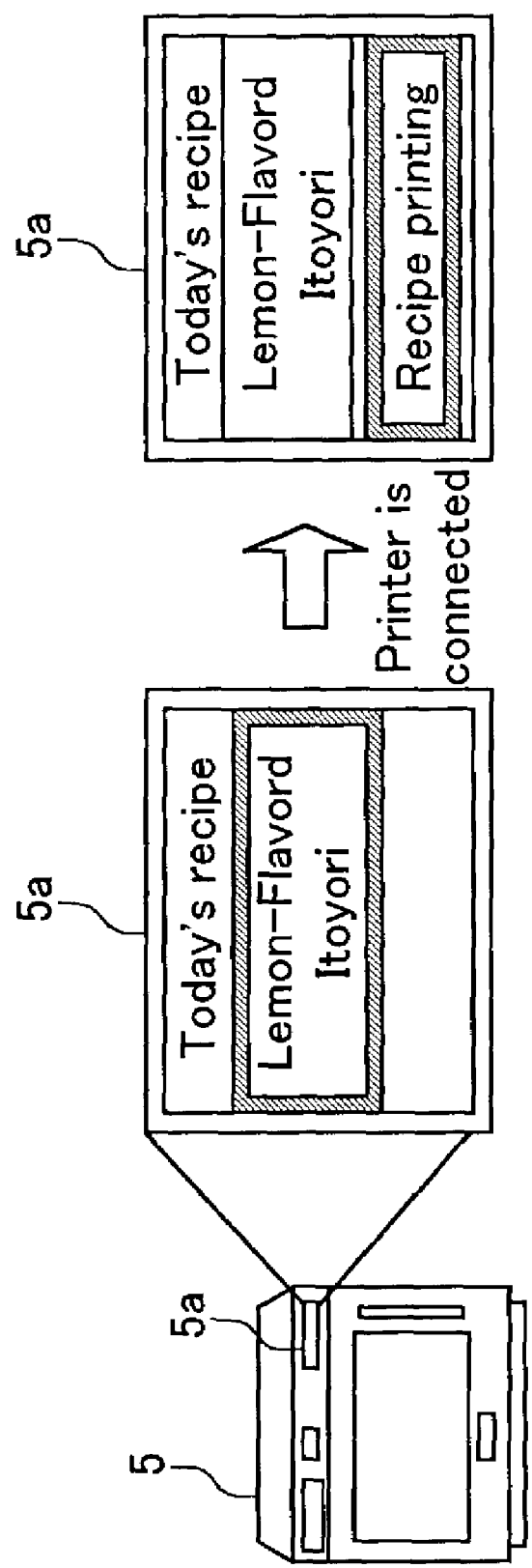
FIG. 22 is a view to illustrate a change in a display state of a liquid crystal panel of a microwave when a printer is connected.

On the other hand, when there is a service-related description of "recipe printing" as shown in FIG. 21 in the service-related storing unit 54b in the function storing unit 54 and the function of the printer 2 is added to the network 7 as shown in FIG. 21, the microwave 5 newly can provide a user with a new service of printing the recipe. Herein, as shown in FIG. 22, a button menu of "recipe printing" is displayed additionally on the liquid crystal panel 5a in the microwave 5.

(Step 2-8)

When a user selects "recipe printing" in the liquid crystal panel 5a, a place of a print image of the recipe contents is sent to the printer 2. As a result, as shown in FIG. 23, the details of the recipe contents are printed out on a paper.

Moreover, on the third line of the HTML description of the recipe contents shown in FIG. 19, the place of the recipe contents for printing out on the paper is described and its content is sent to the printer 2. Thus, as compared with the contents in a text format displayed in the liquid crystal panel 5a of the microwave 5, detailed contents including an image can be printed out.

Moreover, in this embodiment, the microwave was shown as a specific example of the network connection apparatus displaying the contents to a user. However, this embodiment can be carried out by the network connection apparatus provided with a display such as a liquid crystal panel etc. or an information display unit such as a voice guiding device etc. Examples of such apparatuses include arbitrary household electrical appliances, for example, a refrigerator, a rice cooker, an oven, a home bakery, a washing machine, and the like.

Third Embodiment

The third embodiment of the present invention will be explained with reference to FIGS. 24 to 27.

Figure 24:
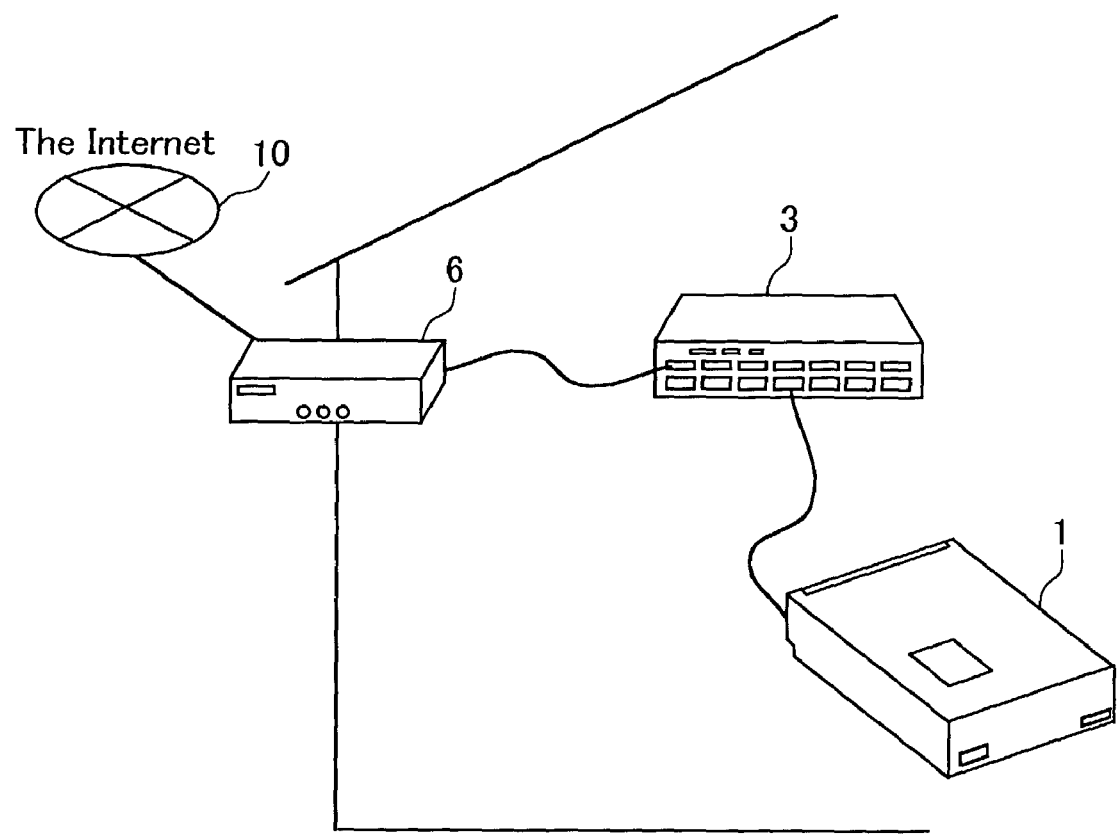
FIG. 24 is a block diagram showing a configuration of hardware of each network connection apparatus in a third embodiment of the present invention.

FIG. 24 is a view to illustrate a configuration of hardware showing the third embodiment. In FIG. 24, a home network including the scanner 1 connected via the hub 3 (the network 7 in FIG. 25) is connected to the outside network 10 such as the Internet via the gateway 6.

Figure 25:
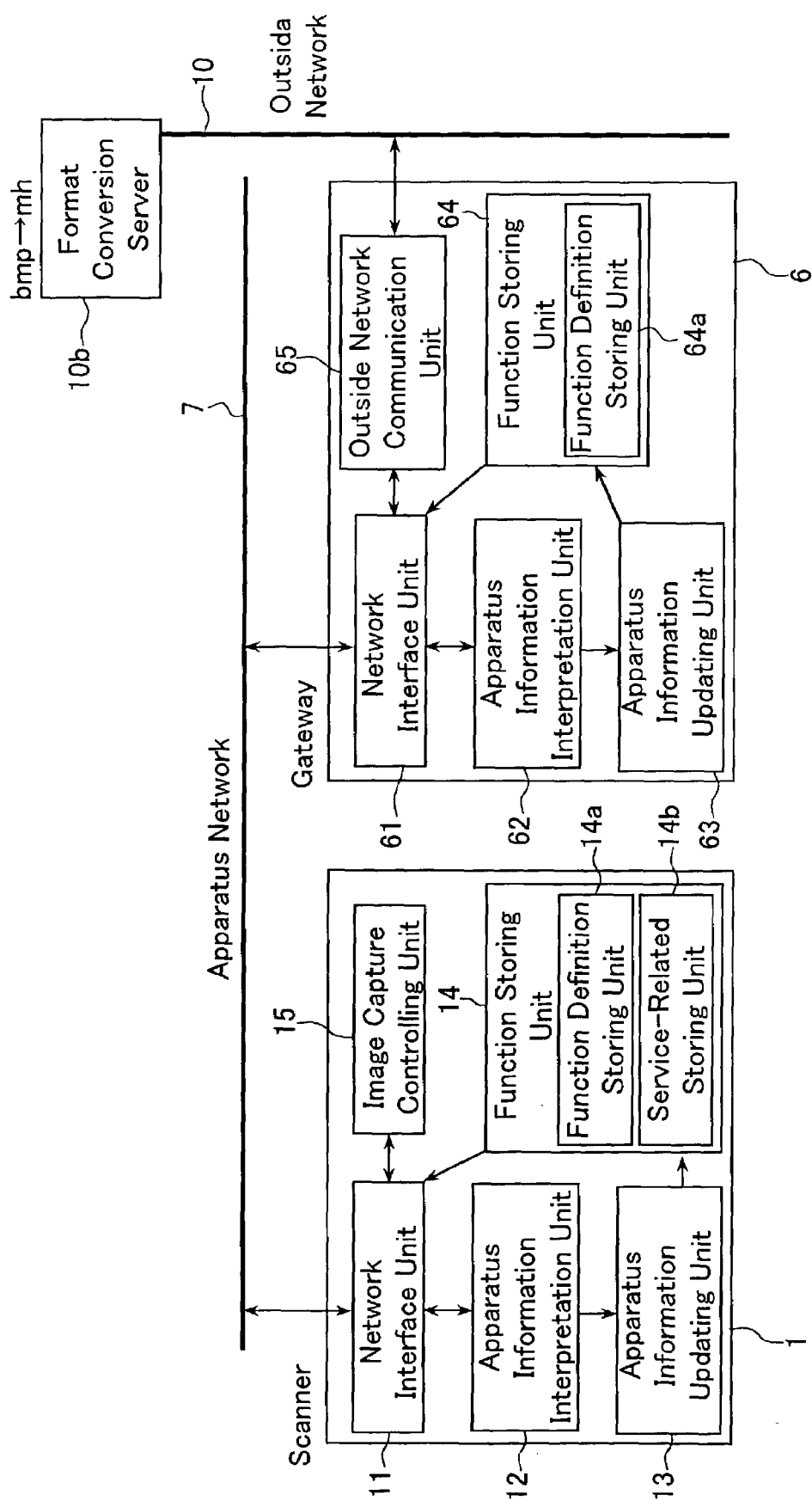
FIG. 25 is a view to illustrate a configuration of software of each of the network connection apparatus.

FIG. 25 is a block diagram showing a configuration of software existing in the hardware shown in FIG. 24. Since the basic configurations of the software of the scanner 1 and the gateway 6 are the same as those in the first and the second embodiment, the explanations therefore are omitted herein.

In this embodiment, on the outside network 10, there is a format conversion server 10b for providing a service for converting a bmp format image file into an mh format file that can be used in the facsimile machine. The address of the format conversion server 10b is registered in the gateway 6 in advance.

The following is an explanation of the operation in the case where the gateway 6 is connected additionally to the network to which only the scanner 1 is connected.

(Step 3-1)

The gateway 6 newly connected to the network 7 obtains a new apparatus unique ID in the network 7 as explained in the second embodiment. Herein, the apparatus unique ID of the scanner 1 is "192.168.2.1" and the newly connected gateway 6 is assumed to have an apparatus unique ID, "192.168.2.2."

(Step 3-2)

The gateway 6, similar to the second embodiment, broadcasts the content:

"join 192.168.2.2 gateway gatewaysdl"

in order to notify the other apparatuses on the network 7 of the function of its own apparatus. This indicates that the function of the gateway 6 is described in "http://192.168.2.2/gateway.sdl."

Figure 26:
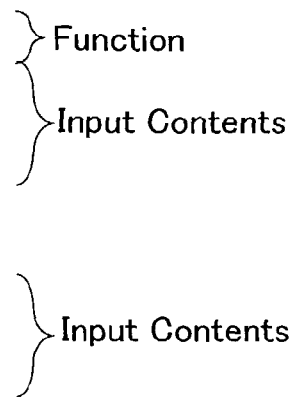
FIG. 26 is a view to illustrate an example of a function definition description of a gateway.

Herein, FIG. 26 shows an example of the description content of "gateway.sdl." According to an example shown in FIG. 26, it is defined that the gateway 6 has a "send" function for sending electronic data and is capable of communicating under the protocol of SMTP. Furthermore, it also is defined that the gateway 6 has a "send" function for inputting an mh format file from the network 7 and sending the facsimile format (G3 mode).

(Step 3-3)

The scanner 1, based on the signal of the gateway 6, recognizes that the apparatus having a function defined as shown in FIG. 26, that is, the apparatus having a "send" function under the protocol of SMTP or G3 format, is connected newly to the network 7. The function of the scanner 1 is to capture the image information on a paper in a bmp format file as shown in FIG. 4 in the first embodiment.

Figure 27:
FIG. 27 is a view to illustrate a service-related description of "fax" that is a cooperative service.

Furthermore, in the service-related storing portion 15b of the function storing portion 15 in the scanner 1, as shown in FIG. 27, the service-related description as to "fax" service is assumed to be present. However, in the input contents shown in FIG. 27, the file format to be treated is designated to have the bmp format. On the other hand, in the function definition description of the gateway 6 shown in FIG. 26, the file to be treated has an mh format.

(Step 3-4)

Then, the scanner 1 inquires of the gateway 6 as to whether the bmp format file can be converted into the mh format file by utilizing the service of the outside network 10. The gateway 6 inquires of the format conversion server 10b as to whether the service for converting the bmp format into the mh format file is present. In the case where the format conversion server 10b replies that it is possible to provide a service of converting the bmp format into the mh format, the gateway 6 notifies the scanner 1 of the fact.

(Step 3-5)

The scanner 1 reads out the information on the inserted paper and converts it into the bmp format electronic file and sends it to the gateway 6. The gateway 6 allows the bmp file received from the scanner 1 by the network interface unit 61 via the network 7 to move to the format conversion server 10b by the outside network communication unit 65.

Then, the gateway 6 obtains the file converted into the mh format from the format conversion server 10b by the outside network communication unit 65. Then, the outside network communication unit 65 sends the obtained mh format file to a destination designated by a user by a G3 mode as defined in the function definition description shown in FIG. 26. Consequently, the "fax" service defined in the service-related description in FIG. 27 can be realized.

As mentioned above, in this embodiment, the gateway 6 searches a service provided by the outside network 10 and utilizes the outside service for converting the bmp format into the mh format, thereby making it possible to provide a new cooperative service that cannot be realized only by the apparatus connected to the network 7.

Fourth Embodiment

Figure 28:
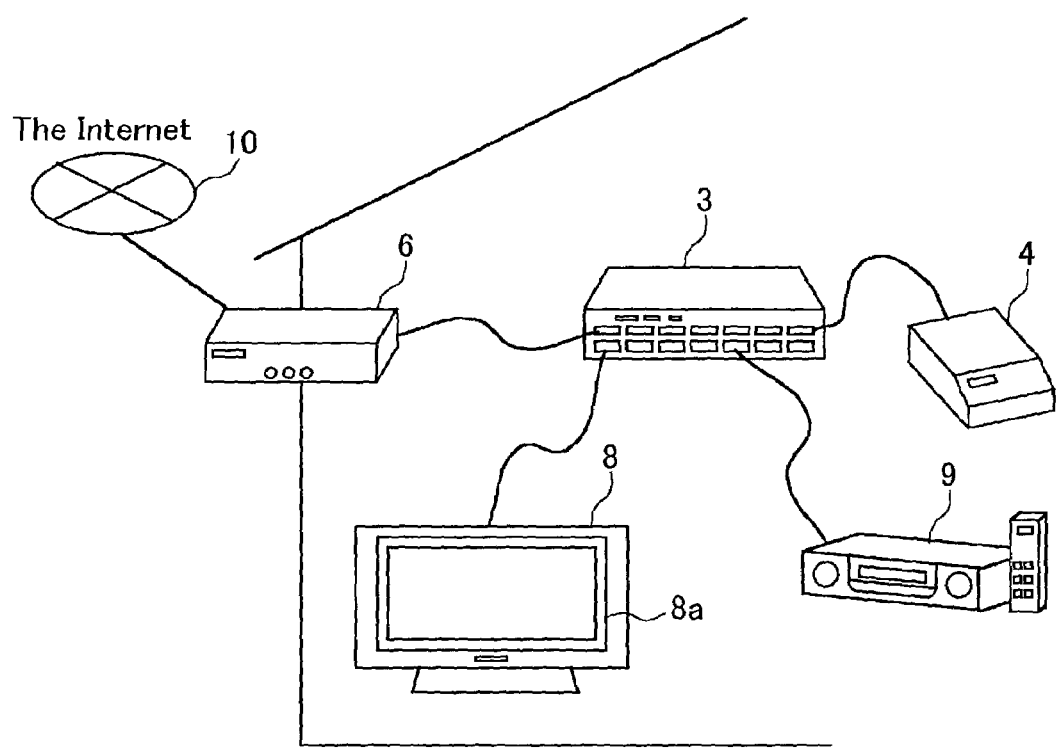
FIG. 28 is a block diagram showing a configuration of hardware of each network connection apparatus in a fourth embodiment of the present invention.

The fourth embodiment of the present invention will be explained with reference to FIGS. 28 to 32. FIG. 28 is a view to illustrate a configuration of hardware in the fourth embodiment.

In FIG. 28, the home network (network 7 in FIG. 29), in which a display 8 realized by a large screen television set etc., a DVD player 9 and a hard disk 4 are connected via a hub 3, is connected to an outside network 10 such as the Internet etc. via a gateway 6.

Figure 29:
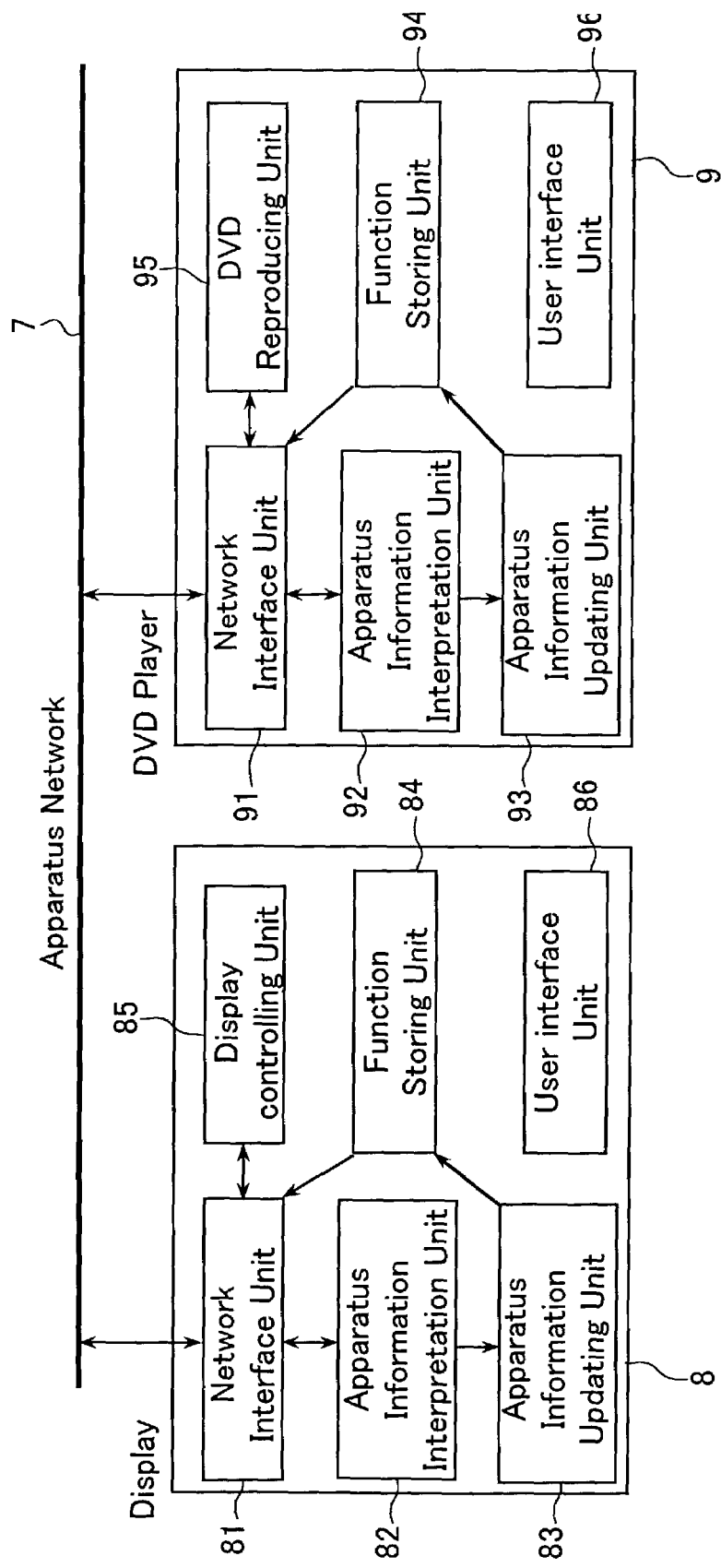
FIG. 29 is a view to illustrate a configuration of software of each of the network connection apparatus.

FIG. 29 shows a configuration of software existing in the hardware shown in FIG. 28.

As shown in FIG. 29, the display 8 includes a network interface unit 81, an apparatus information interpretation unit 82, an apparatus information updating unit 83, a function storing unit 84, a display controlling unit 85 and a user interface unit 86. Furthermore, the DVD player 9 includes a network interface unit 91, an apparatus information interpretation unit 92, an apparatus information updating unit 93, a function storing unit 94, a DVD reproducing unit 95 and a user interface unit 96.

The network interface units 81, 91, the apparatus information interpretation units 82, 92, the apparatus information updating units 83, 93 and the function storing units 84, 94 have the same functions as those of the network interface unit 11, the apparatus information interpretation unit 12, the apparatus information updating unit 13 and the function storing unit 14 of the scanner explained in the first embodiment.

On the other hand, the display controlling unit 85 in the display 8 is a block unique to the display 8 and realizes displaying the screen on the display 8. The user interface unit 86 stores the layout of displaying screen or the unified format of display format in advance and realizes displaying the screen based on the user interface description sent from the other apparatuses as mentioned below.

Furthermore, the DVD reproducing unit 95 in the DVD player 9 is a block unique to the DVD player 9 and realizes a function for reproduction from the DVD. Furthermore, the user interface unit 96 obtains a title information etc. from the inserted DVD and forms a user interface description mentioned below (see FIG. 31).

The following is an explanation of an operation in the case where the DVD player 9 is connected additionally to the network 7 to which only the display 8 is connected.

(Step 4-1)

The newly connected DVD player 9 obtains a new apparatus unique ID in the network 7 by the same procedure as in the step 1-1 in the first embodiment. Herein, the apparatus unique ID of the display 8 is assumed to be "192.168.3.1" and the apparatus unique ID obtained by the DVD player 9 is assumed to be "192.168.3.2."

(Step 4-2)

The DVD player 9 broadcasts the contents:

"join 192.168.3.2 dvd dvd.sdl"

in order to notify the other apparatuses on the network 7 of the function of its own apparatus by the same manner as in the step 1-2 of the first embodiment. This indicates that the function of the DVD player 9 is described in "http://192.168.3.2/dvd.sdl."

Herein, FIG. 30 shows an example of the content of "dvd.sdl." The function definition description shown in FIG. 30 defines that the DVD player 9 has a function of "media" and outputs a 640*480 MPEG motion picture to the network 7. Furthermore, this function definition description also broadcasts that the definition of the user interface of the DVD player 9 is described in "http://192.168.3.2/dvd.uiml."

FIG. 31 shows an example of the user interface definition. In the user interface description shown in FIG. 31, the description from <icon . . . > to </icon> indicates that the icon image of the DVD player 9 is stored in "192.168.3.2/dvd.ico" and that a text attached and displayed on the icon image as an explanation of the device is "DVD." Furthermore, the description from <select . . . > to </select> indicates that when the DVD player 9 is connected to the network 7, two contents (DVDs) of "Pretty Woman" and "Die Hard" are inserted. Thus, the user interface definition description includes only a place of the icon image of the apparatus, a place of the contents and the title description.

The user interface description is generated by the user interface unit 96 at a predetermined timing, such as when the DVD player 9 is connected to the network 7 or when the DVD is attached/detached, etc. As shown in FIG. 31, the user interface description includes only a place of the contents and its title description.

(Step 4-3)

The display 8 recognizes from the contents broadcast by the DVD player 9 that an apparatus having a function described in FIG. 30 is connected to the network 7. Moreover, the display 8 has a function for displaying the content of 640*480 MPEG data when the data are provided.

That is, when the DVD player 9 is connected to the network, the display 8 can provide a new service for displaying the MPEG data sent from the DVD player 9 in cooperation with the DVD player 9. Then, the display 8 displays the icon image of the DVD player 9 and text "DVD" on the left side of the display screen 8a as shown in FIG. 32 based on the place of the icon image ("192.168.3.2/dvd.ico") and its title (DVD) in order to notify a user that the contents provided by the DVD player 9 can be available.

(Step 4-4)

Figure 32:
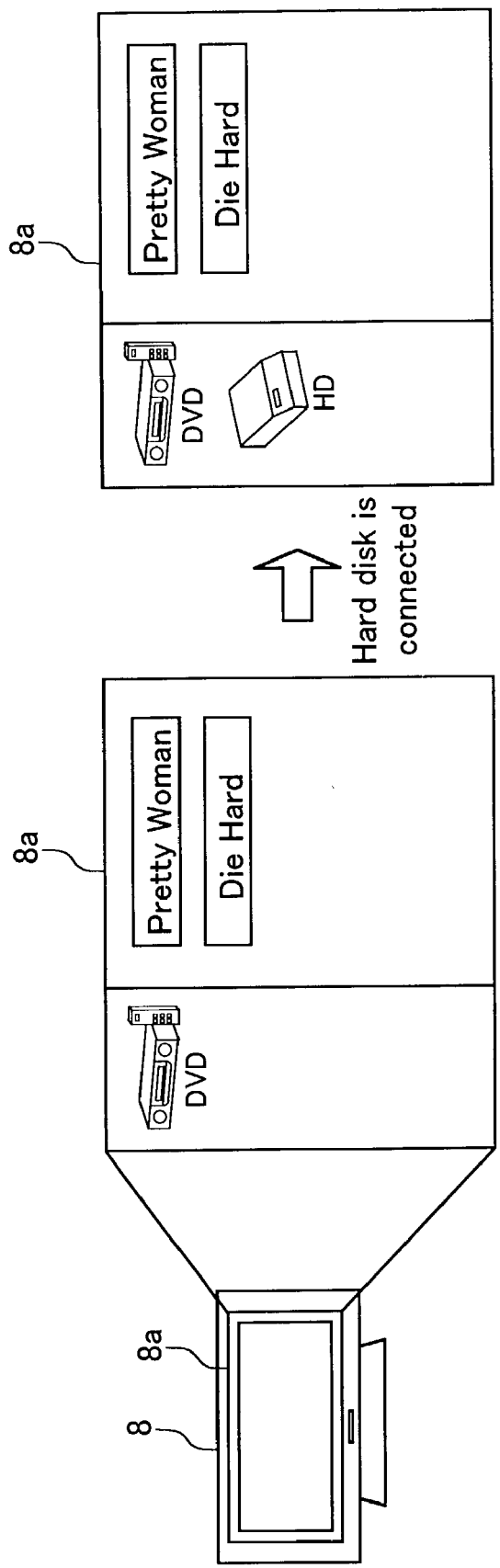
FIG. 32 is a view to illustrate a change in a display state of a display.

Furthermore, when a user selects the icon of the DVD player 9 on this display screen 8a, a button menu of the contents that the DVD player 9 can provide is displayed on the right side of the display screen 8a as shown in FIG. 32.

This button menu display can be realized when the user interface unit 86 of the display 8 applies the DVD title in the user interface description broadcast by the DVD player 9 to a predetermined layout and display format.

Like this, the layout or display format of the button menu is managed uniformly in the display 8 and the title etc. of the contents broadcast from the apparatuses are applied to this layout and display format, thereby realizing the interface to a user. Consequently, it is possible to construct the interface to a user uniformly even if various apparatuses are connected to the display 8.

(Step 4-5)

Furthermore, when a hard disk 4 is connected additionally to the network 7, similarly, an icon representing the hard disk 4 is formed on the left side of the display screen 8a shown in FIG. 32. Moreover, as to the icon image and its explanation of the hard disk 4, the place of the icon and its explanation text thereof ("HD") are described in the user interface definition description of the hard disk 4 the same as in the case where the icon of the DVD player 9 is displayed in the step 4-3. Furthermore, when a user selects the icon of the hard disk 4, the titles of the contents stored in the hard disk 4 are displayed as a button menu on the right side of the screen.

As mentioned above, in this embodiment, the apparatus such as the DVD player or the hard disk etc. describes only the explanation of each apparatus or service that can be provided in the function definition description etc. And the apparatus such as display etc. having an interface with a user determines the layout of the user interface, that is, the layout of icon etc. Thus, the apparatus having a user interface can provide a user with the uniform interface.

Note here that in the first to fourth embodiments, each network apparatus broadcasts an apparatus unique ID of its own apparatus and function information not only when the apparatus is connected to the network 7 but also at an appropriate time thereafter. Thereby, each network connection apparatus can check the connection state of the other apparatuses. That is, when the broadcast from one of the other apparatuses cannot be heard, each network connection apparatus judges that the apparatus is detached from the network or power is off for some reason and recognizes that the service using the apparatus cannot be provided.

Note here that in each of the embodiments, HTTP on the Ethernet was illustrated as an example for the communication protocol between the apparatuses. However, the other protocols such as SMTP, UDP and others, which can be in accordance with communication media, can be used. Furthermore, an Echonet protocol or a protocol on IEEE 1394 may be used.

Note here that in each of the embodiments, a configuration using a cable physical layer of Ethernet was illustrated as an example. However, a radio communication physical layer such as Bluetooth, a specific a low-power radio or the like may be used. At this time, instead of the operation of a user's connecting each apparatus to a hub, communication between the apparatuses is started when the apparatuses are closer to the range in which they can communicate with each other.

Note here that in each of the embodiments, the example in which the network interface unit etc. is configured as a software module was explained. However, the configuration is not limited thereto, and it is possible to realize each network connection apparatus by incorporating a chip formed of the network interface unit, etc. as hardware (so-called network chip) in household electrical appliances. Consequently, by connecting each apparatus by the network chip of the unified hardware, it is expected that the interconnection property can be improved.

Furthermore, in each of the above-mentioned embodiments, a liquid crystal panel was shown as an example of an information display unit for displaying information to a user. However, information can be given by audible guidance.

Fifth Embodiment

Figure 33:
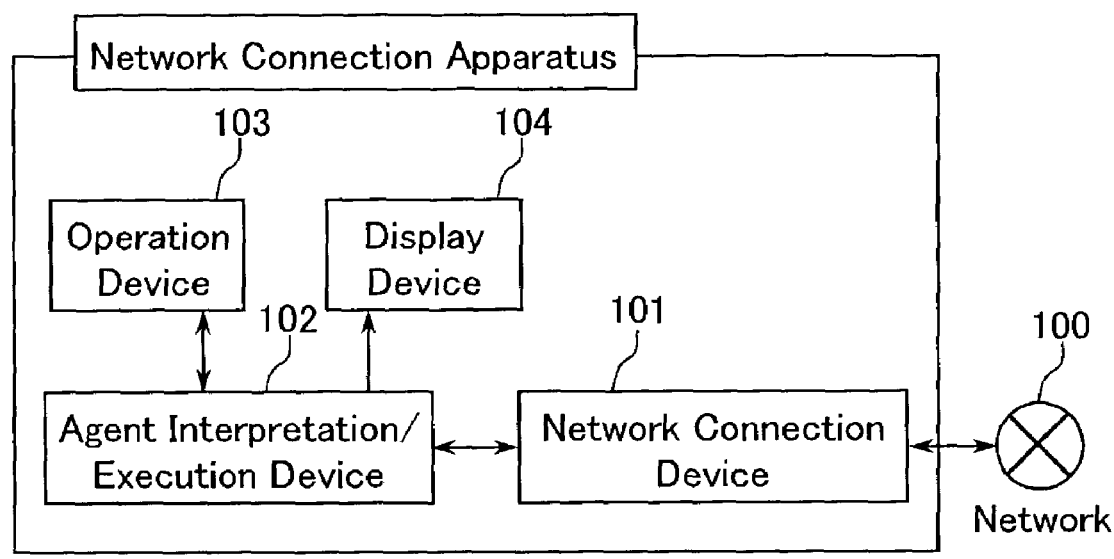
FIG. 33 is a block diagram of a network connection apparatus in a fifth embodiment of the present invention.

FIG. 33 is a block diagram showing a network connection apparatus according to a fifth embodiment of the present invention.

Reference numeral (100) denotes a network, for example, the Internet using a telephone line, ISDN, etc.; an intranet via a private line; an Echonet in a home electric distribution system; an optical fiber for home use such as FTTH (Fiber to the Home), and the like.

Reference numeral (101) denotes a network connection device for exchanging data on the network, such as control information of the network connection apparatus, display information, communication information, etc. via the network 100. Reference numeral (102) denotes an agent interpretation and execution device for interpreting and executing agent data described in a script, etc., for example, various control information, display information, etc. among the data received from the network connection apparatus 101.

Reference numeral (103) denotes an operation device for informing the operation information from a user of the agent interpretation and execution device 102, or for informing a user of how the user feels during operation. Reference numeral (104) denotes a display device for informing a user of an apparatus information of a user based on the information from the agent interpretation and execution device 102. The display device 104 can be realized by using, for example, a liquid crystal display, a Braille display, etc.

Some of the network connection apparatus, for example, a printer, do not have a display device although it has an operation device because its main function is to output data. Furthermore, in a simple outputting apparatus, if the apparatus has only the simple function of outputting data when the data come from the network, both a display device and operation device may not be needed.

Figure 38:
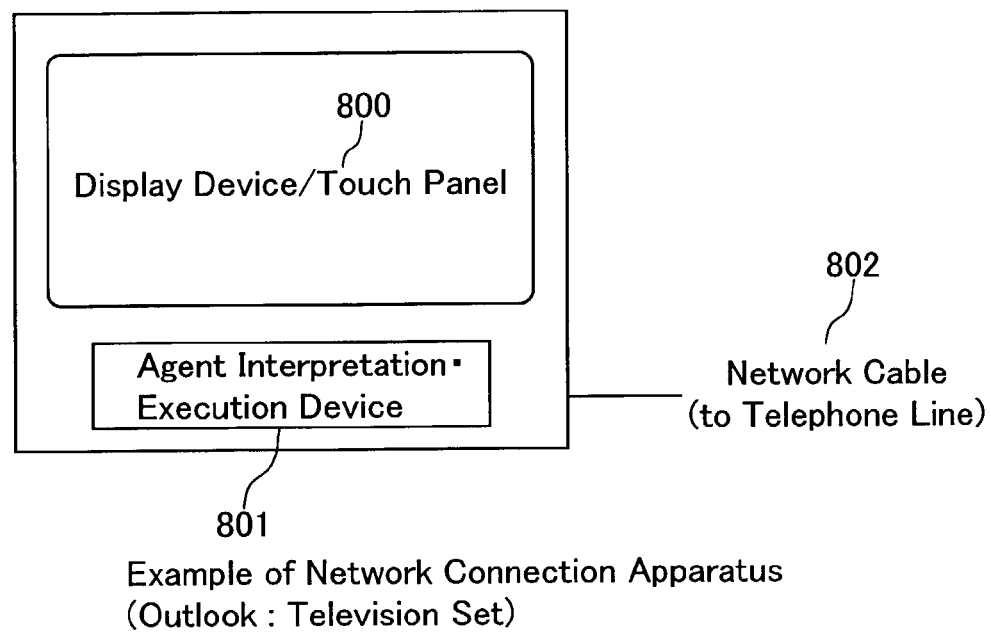
FIG. 38 is a block diagram showing a specific example of the network connection apparatus according to the fifth embodiment.

Herein, as shown in FIG. 38, as an example of the network connection apparatus, a TV set that is a household electrical appliance is illustrated as an example. In this case, with the display device/touch panel 800, various information is displayed to a human while the operation of the human via the touch panel is captured, thereby selecting information. The agent interpretation and execution device 801 interprets and executes the information (display information, selection information, etc.) in cooperation with the information on the network obtained via the network cable 802.

Figure 39:
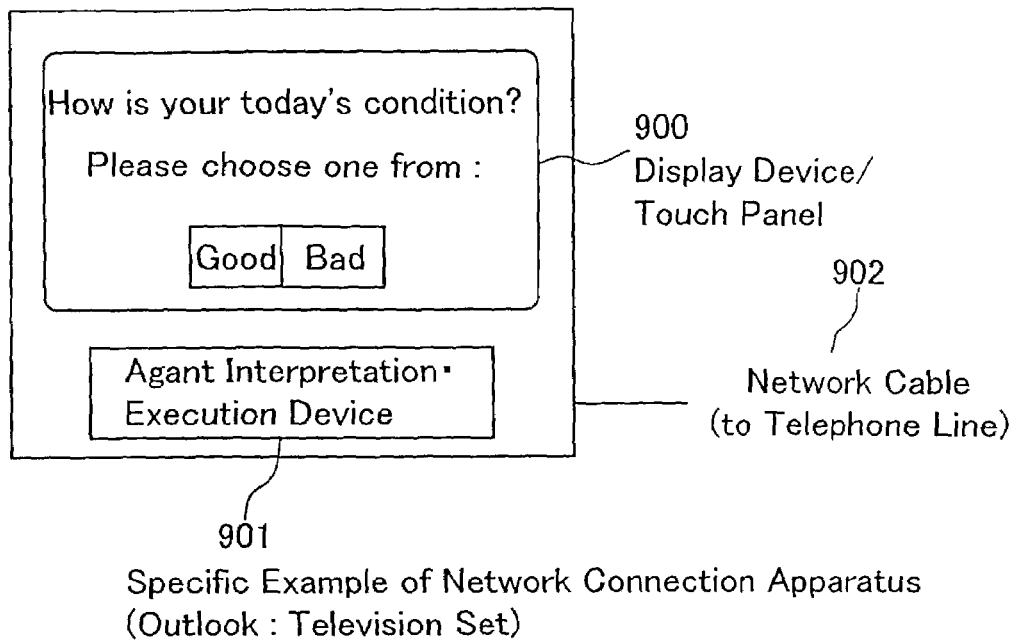
FIG. 39 is a block diagram showing a specific example of the network connection apparatus according to the fifth embodiment.

Specifically, as shown in FIG. 39, in a home where elderly persons live, every time the power of a TV set is on, agent data are sent from a place in charge of health care administration, for example, a health center, via the network cable 902 and a desired message is displayed on the display device/touch panel 900 by the agent interpretation and execution device 901. The agent interpretation and execution device 901 waits for a reply from a user with respect to the displayed message and when the reply is input, interprets the input information and sends the information via the network cable 902. Thus, information exchange between home and the outside is carried out. Besides, information about the failure of apparatuses, etc. is exchanged via the network, thereby enabling the troubleshooting, apparatus management, upgrade, etc. from the remote place.

As mentioned above, in this embodiments, via the network 100, various agent data are sent, thereby enabling the new function to be added to the conventional household electrical appliances, etc. Thus, it is possible to improve a service to a user.

Note here that the display device includes not only an image, sound, but also an alert or light-emitting lamp, feeling by touch, etc. capable of delivering the information to the senses. Furthermore, the operation device includes not only a button or a touch panel but also an alternative means such as a sound recognition means, a visual line recognition means, etc. so that a person who cannot operate the apparatus with the limbs can input.

In this embodiment, both operation device 103 and the display device 104 are provided. However, an output device, etc. for only displaying, that is, one of the devices may be employed, or operation device 103 and display device 104 may not be provided.

Sixth Embodiment

Figure 34:
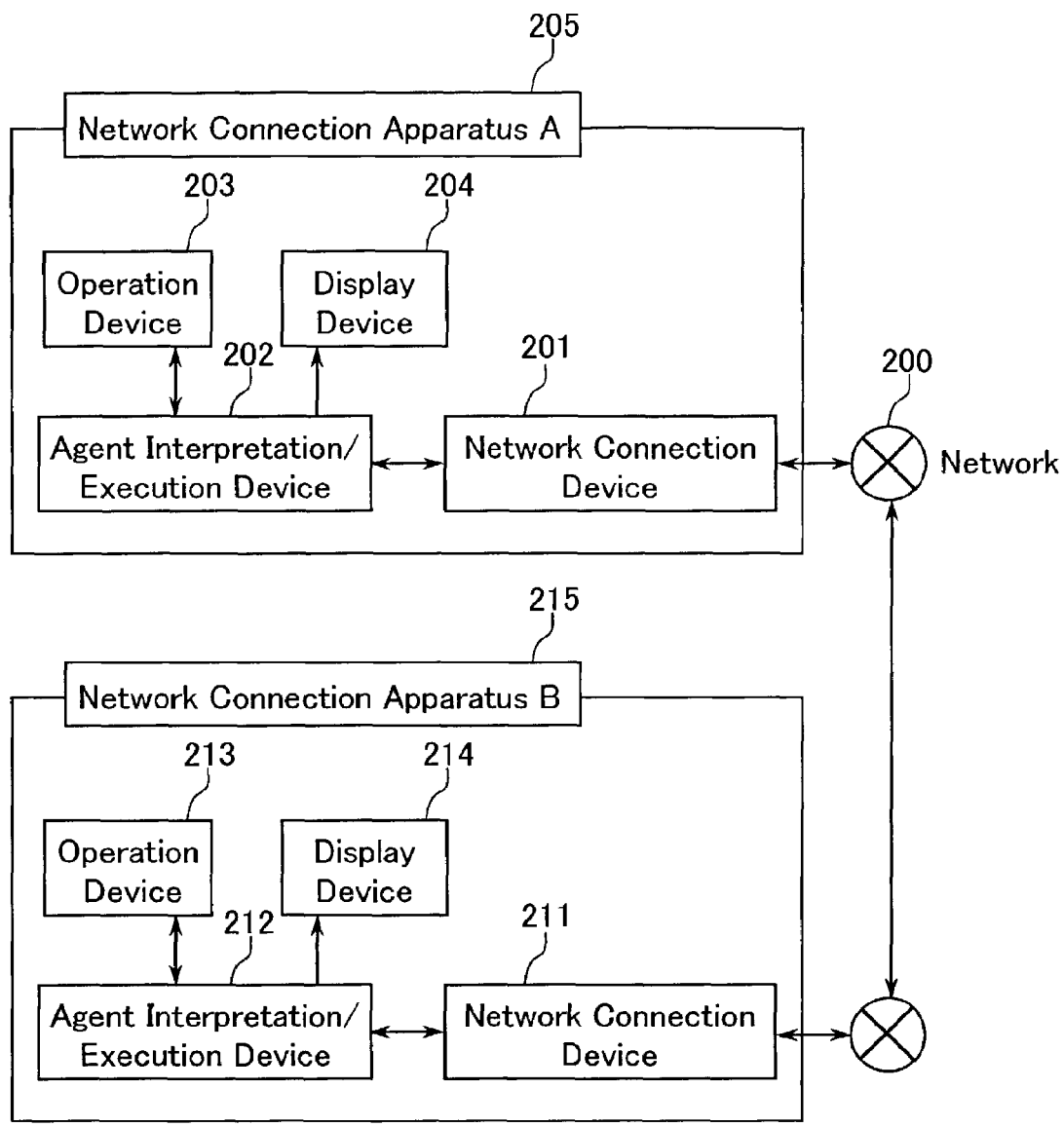
FIG. 34 is a block diagram of a network connection apparatus in a sixth embodiment of the present invention.

FIG. 34 is a block diagram showing a network connection apparatus according to a sixth embodiment of the present invention.

Reference numeral (200) denotes a network, for example, the Internet using a telephone line, ISDN, etc.; an intranet via a private line; an Echonet in a home electric distribution system; an optical fiber for home use such as FTTH, and the like.

Reference numeral (201) denotes a network connection device for exchanging data on the network, such as control information of the network connection apparatus, display information, communication information, etc. via the network 200. Reference numeral (202) denotes an agent interpretation and execution device for interpreting and executing agent data described in a script, etc., for example, various control information, display information, etc. among the data received from the network connection apparatus 201.

Reference numeral (203) denotes an operation device for informing the operation information from a user of the agent interpretation and execution device 202, or for informing a user of how the user feels during operation. Reference numeral (204) denotes a display device for informing the apparatus information of a user based on the information from the agent interpretation and execution device 202. The display device 204 can be realized by using, for example, a liquid crystal display, a Braille display, etc.

Reference numeral (205) denotes a network connection apparatus A including the above-mentioned network connection device 201, the agent interpretation and execution device 202, the operation device 203 and the display device 204. Reference numeral (211) denotes a network connection device for exchanging data on the network, for example, control information of apparatuses, display information, communication information, etc. via the network 211.

Reference numeral (212) denotes an agent interpretation and execution device for interpreting and executing agent data described in a script, etc., for example, various control information, display information, etc. among the data received from the network connection apparatus 211.

Reference numeral (213) denotes an operation apparatus for informing the operation information from a user of the agent interpretation and execution device 212, or for informing a user of a feeling of operation. Reference numeral (214) denotes a display device for informing apparatus information of a user based on the information from the agent interpretation and execution device 212. The display device 214 can be realized by the use of, for example, a liquid crystal display, a Braille display, etc.

Reference numeral (215) denotes a network connection device B including the above-mentioned network connection device 211, the agent interpretation execution device 212, the operation device 213 and the display device 214.

Figure 40:
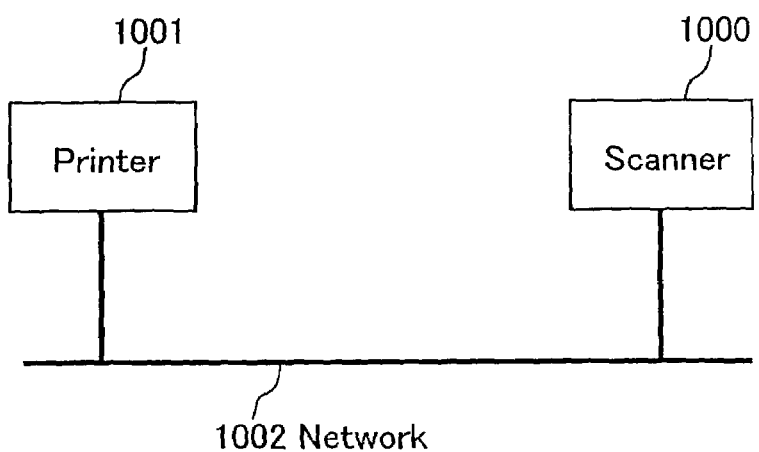
FIG. 40 is a block diagram showing a specific example of the network connection apparatus according to the sixth embodiment.

Herein, as shown in FIG. 40, the case where a scanner 1000 capable of scanning a document into digital image data and a printer 1001 capable of printing the original digital image data into a document are connected to the network 1002 will be explained. Note here that the scanner 1000 and the printer 1001 correspond to the network connection apparatuses A and B shown in FIG. 34, respectively.

When first only the scanner 1000 is connected to the network 1002 and then the printer 1001 is connected to the network 1002, the agent interpretation and execution device inside the printer 1001 sends a capability of executing by the printer 1001 and a unique ID thereof, via the network connection device.

Thereby, the agent interpretation and execution device in the scanner 1000 recognizes whether a new service can be provided. The environment is changed so that the scanner 1000 can execute the service notified by the printer 1001 via the agent. At this time, a central management system called a server is not necessary, and by connecting only the subjected apparatus to the network, a new service can be realized.

As mentioned above, in this embodiment, various kinds of agent data are sent via the network 1002, a new function can easily be added to the household electrical appliances, etc. without a server, thus enabling the service etc. to a user to be improved.

In the present invention, a printer is used for printing, but printing is not necessarily carried out by a printer, and any other devices capable of printing image data into a paper may be used. Printing work may be carried out by, for example, a plotter or a robot.

Note here that in this embodiment, a scanner is used as an inputting device, but the inputting is not necessarily carried out by a scanner, and any other device capable of capturing image data may be used. For example, a film scanner, a digital camera, a capture camera, etc. may be used.

In this embodiment, the relationship between the input and output was explained with reference to a static image document. However, the subjected data may be a motion picture or sound, etc. A configuration in which the motion picture video is stored in a hard disk, for example, a configuration including a hard disk and a satellite receiver, may be used. Furthermore, a combination of MD and FM broadcasting receiver, or combination of a high-definition TV and a DVD player, etc. may be used.

Seventh Embodiment

The seventh embodiment of the present invention relates to a network connection apparatus that is characterized by placing services that can be provided on the display screen based on information connected between the network connection apparatuses.

For instance, in the case where the network connection apparatus is a scanner, if it is present as a single apparatus, it is a simple inputting apparatus for scanning a document and is not capable of outputting. However, if the printer is connected via the network, service of printing is possible and the item of "printing" is added on the displayed menu.

Furthermore, when a facsimile is connected via the network, the image read out by the scanner can be sent by a FAX. When a hard disk is connected via the network, the document read out by the scanner can be stored. When a display device such as a TV set, etc. is connected via the network, the document read out by the scanner can be displayed as an image.

Figure 35:
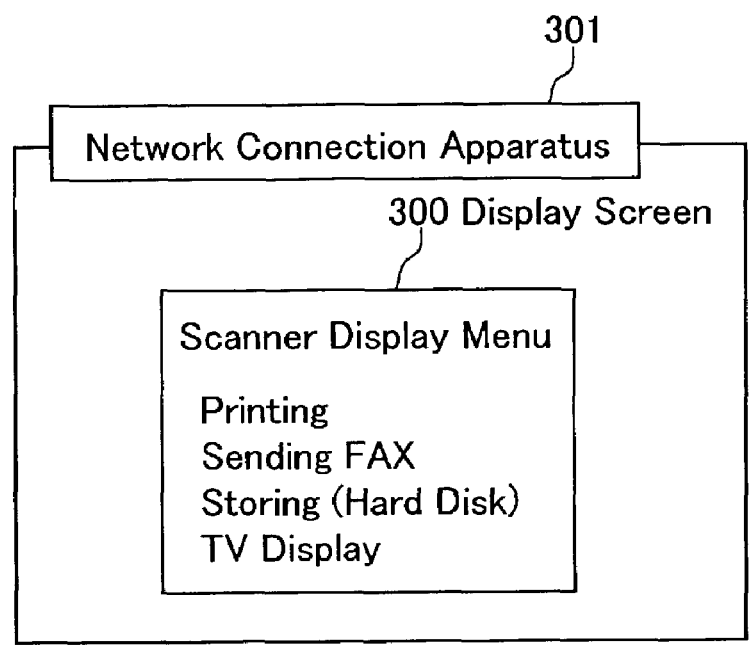
FIG. 35 is a block diagram of a network connection apparatus in a seventh embodiment of the present invention.

FIG. 35 is a block diagram of a network connection apparatus according to this embodiment. Reference numeral (300) denotes a display screen for displaying services that can be provided based on the information connected between the network connection apparatuses. Reference numeral (301) denotes a network connection apparatus having the display screen 300.

For instance, in the network connection apparatus connected as shown in FIG. 40, when first only a scanner 1000 is connected to a network 1002, nothing is displayed on the display device of the scanner, which cannot provide a service alone. When the printer 1001 is connected to the network 1002, as explained in the previous embodiment, the agent communication is carried out. As a result, the menu GUI shown in FIG. 35 is formed. Every time a new network connection apparatus is connected to the network 1002, as listed on the display screen 300, various functions of the apparatuses are added.

In the case of the configuration shown in FIG. 10, when the printer 1001 is connected additionally, the function of "printing" is listed up on the display screen 300 of the network connection apparatus 301 (that is, the scanner 1000). When a user selects the "printing" function based on the display screen 300, the image captured by the scanner 1000 is printed by the printer 1001.

Figure 41:
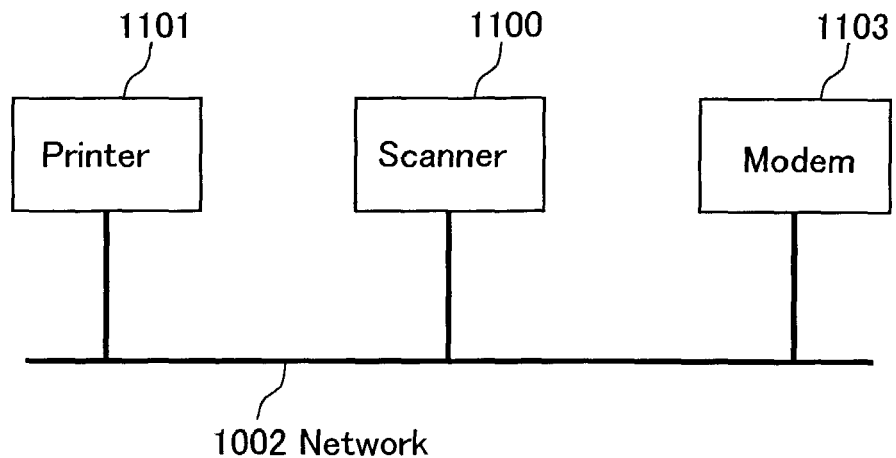
FIG. 41 is a block diagram showing a specific example of the network connection apparatus according to the seventh embodiment.

As shown in FIG. 41, when a modem 1103 is connected newly to the network configuration of FIG. 40, the image captured by the scanner 1101 can be FAX sent to the outside through a telephone line by using the modem 1103. In such a state, as shown in FIG. 35, "FAX sending" is displayed in the display screen 300.

As mentioned above, in this embodiment, by sending various kinds of agent data via the network 1002, it is possible to carry out the addition, etc. of new functions to a household electrical appliance etc. easily without a server. Furthermore, a GUI is displayed to allow a user to select, thus enabling the service, etc. to the user to be improved.

Note here that the display device includes not only an image, sound, but also an alert or light-emitting lamp, feeling by touch, etc. capable of displaying the information to the senses. Furthermore, the operation device includes not only a button or a touch panel but also an alternative means such as a sound recognition means, a visual line recognition means, etc. so that a person who cannot operate the apparatus with the limbs can input.

In the present invention, a printer is used for printing, but printing is not necessarily carried out by a printer, and any other devices capable of printing image data into a paper may be used. Printing work may be carried out by, for example, a plotter or a robot.

Note here that in this embodiment, a scanner is used as an inputting device, but the inputting is not necessarily carried out by a scanner, and any other device capable of capturing image data may be used. For example, a film scanner, a digital camera, a capture camera, etc. may be used.

Moreover, in the present invention, as a FAX sending means, a modem was used, but kinds of sending means are not particularly limited and any other devices capable of sending data to the outside via a telephone line such as a portable phone, a stationary phone, a FAX etc., may be used.

Eighth Embodiment

A network connection apparatus according to the eighth embodiment of the present invention includes an address resolving means for distributing a unique address for each kind apparatus on the network by using a method for allocating ID as an apparatus ID of the apparatus of its own sequentially from smaller ID number from the pooled ID numbers, thereby enabling all the apparatuses connected to the network to be distinguished from each other.

Furthermore, with the broadcasting means, a unique address of each apparatus or unique service information, etc. is notified to the entire network at a constant time so that all the apparatuses connected to the network can recognize it. The contents of services and ability are described in an index information format in, for example, a script, etc. Information is sent to the other apparatuses from an index information issuing means that issues the index information.

The index information has information showing various kinds of contents of services, etc. expressed by such an expression that a human can understand. For example, it also is possible to form GUI displayed by a form such as a touch panel, in which a human also can operate later. With the data request means for requesting the service selected by a touch panel etc. to the specific network apparatus, the services of the other apparatuses connected to the network can be received.

Figure 36:
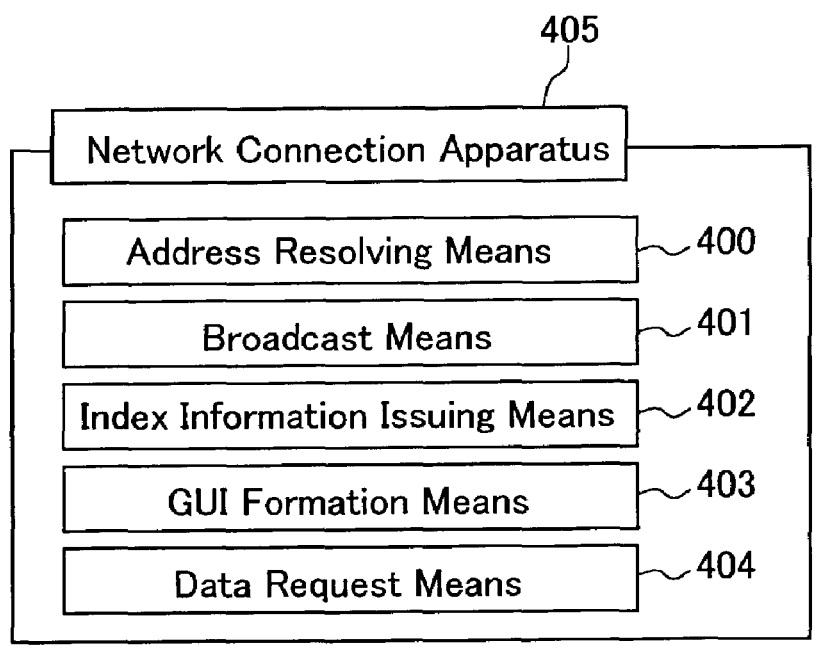
FIG. 36 is a block diagram of a network connection apparatus in an eighth embodiment of the present invention.

FIG. 36 is a block diagram of a network connection apparatus according to this embodiment. Reference numeral (400) denotes an address resolving means for distributing unique address for each kind of apparatus on the network by using a method for allocating ID sequentially from smaller ID number from the pooled ID numbers.

Reference numeral (401) denotes a broadcast means for notifying all the apparatuses connected to the network of the unique addresses of various apparatuses or unique service information, etc. at a constant time. Reference numeral (402) denotes an index information issuing means for issuing the index information in which the content of service and ability of various kinds of apparatuses are described in, for example, a script etc.

Reference numeral (403) denotes a GUI formation means for forming GUI in a format in which a human can understand and which can be operated later as in, for example, a touch panel. Reference numeral (404) denotes a data request means for requesting the selected service to a specific network apparatus.

Reference numeral (405) denotes a network connection apparatus including the address resolving means (400), the broadcast means (401), the index information issuing means (402), the GUI formation means (403) and the data request means (404).

Figure 42:
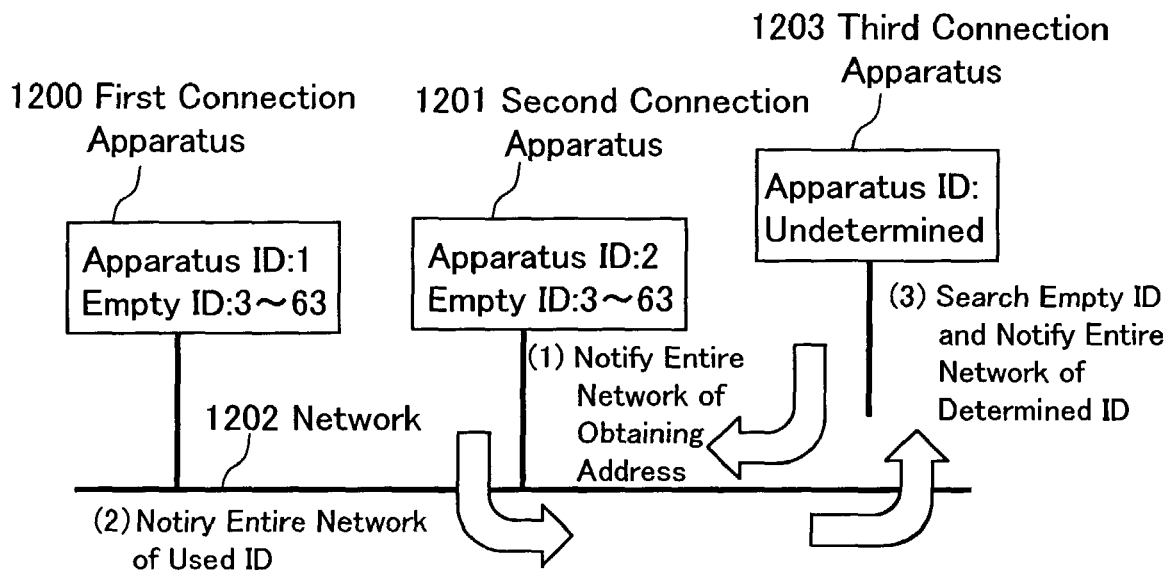
FIG. 42 is a block diagram showing a specific example of the network connection apparatus according to the eighth embodiment.

For instance, the following is an explanation of the network connection apparatus connected as shown in FIG. 42, wherein when a connection apparatus 1200 and a second connection apparatus 1201 initially are connected to the network 1202, and each apparatus ID is "1" and "2" respectively, a third connection apparatus 1203 is connected newly to the network 1202.

The third connection apparatus 1203 does not have a determined apparatus ID before it is connected to the network 1202. However, when it is connected to the network 1202, it sends by broadcasting to all the connection apparatuses connected to the network that the third connection apparatus 1203 joins to the network and that it obtains an address.

Thereafter, when the agent interpretation and execution device existing in each connection apparatus sends the apparatus ID of its own apparatus, the third connection apparatus 1203 searches the previous ID table for an empty ID and makes it to be an ID of the third connection apparatus 1203.

When the third connection apparatus 1203 sends to the entire network that the ID of its own apparatus is determined, the ID of the third connection apparatus 1203 is established on the network. Since all the processing is carried out between the individual communications, the processing is not managed by a central management system called a server.

Figure 37:
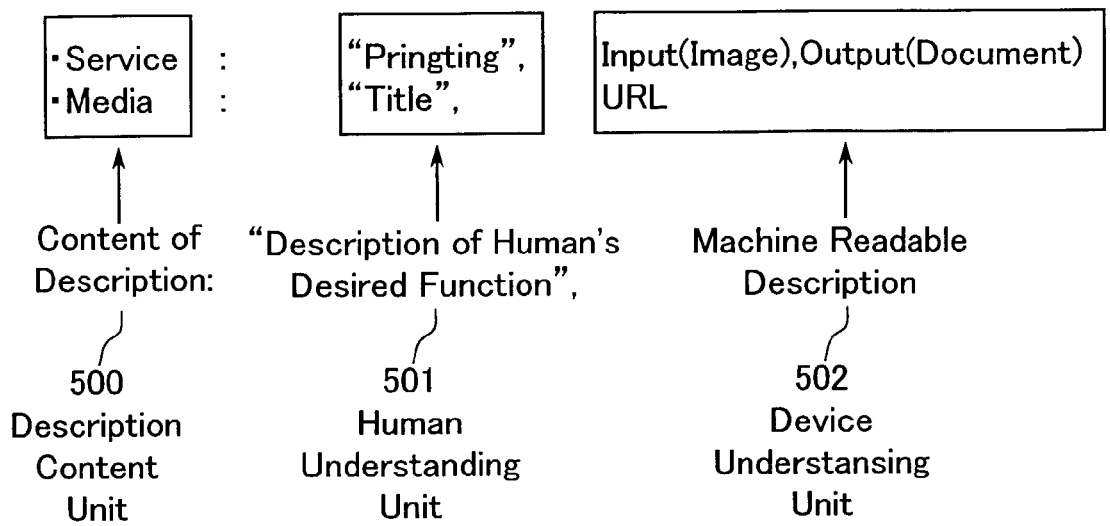
FIG. 37 is a view to illustrate an index information description used in a network connection apparatus according to a ninth embodiment of the present invention.

Furthermore, as shown in FIG. 37, the index information is a script description including a human understanding unit 501 that is a description desired by a human and an apparatus understanding unit 502 that is a machine readable description. By displaying this human understanding unit 501 on the network connection apparatus 405, GUI can be provided by the function that can be understood by a human. With this means, the GUI formation means 403 can be realized, thus enabling the understanding of a human and the control of the connection apparatus to be combined.

Figure 43:
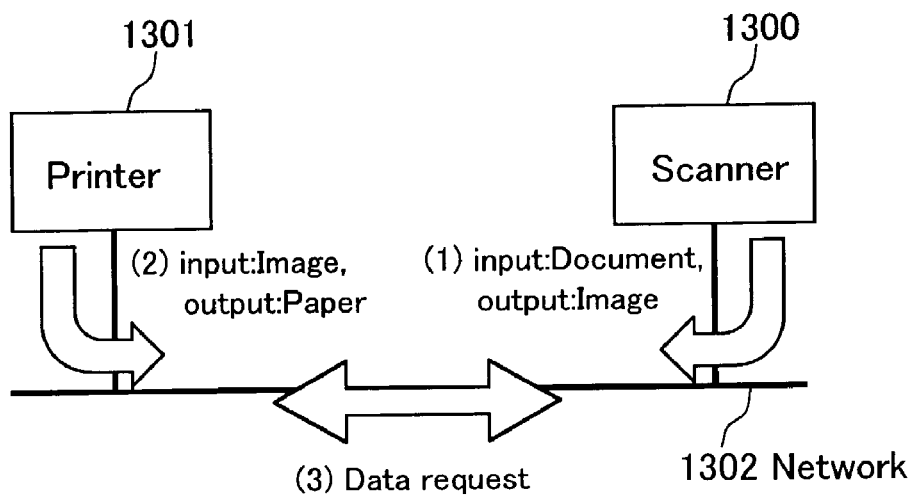
FIG. 43 is a block diagram showing a specific example of the network connection apparatus according to the ninth embodiment.

Furthermore, for instance, as shown in FIG. 43, the data request means 404 notifies the printer 1301 of the input function and the output function from the scanner 1300 via the network 1302. Next, the printer 1301 notifies the scanner of the input function and output function via the network 1302. At that time, the agent understands the fact that the output function of the scanner 1300 matches to the input function of the printer 1301 on an autonomous and dispersion basis and that service can be realized by each kind of the apparatuses. In this system, the scanner 1300 selects the printer 1301 as an output device to make a request of data.

As mentioned above, in this embodiment, by sending various kinds of agent data via the network 1202, an addition etc, of a new service to household electrical appliances can be carried out easily without a server. Furthermore, by displaying GUI to a user for selecting, which may lead to an improvement of the service to a user.

The display device includes not only an image, sound, but also an alert or light-emitting lamp, feeling by touch, etc. capable of displaying the information to the senses. Furthermore, an operation device includes not only a button or a touch panel but also an alternative means such as a sound recognition, a visual line recognition, etc. so that a person who cannot operate the apparatus with the limbs can input.

In the present invention, a printer is used for printing, but printing is not necessarily carried out by a printer, and any other devices capable of printing image data into a paper may be used. Printing work may be carried out by, for example, a plotter or a robot.

In this embodiment, a scanner is used as an inputting device, but inputting is not necessarily carried out by a scanner, and any other device capable of capturing image data may be used. For example, a film scanner, a digital camera, a capture camera, etc may be used.

Ninth Embodiment

A network connection apparatus according to a ninth embodiment of the present invention is characterized in that an index information description in which the service content on the network is described includes a description content unit for expressing the entire apparatus, a human understanding unit in which a human can understand the service content and a device understanding unit in which the service that can be understood by the network connection apparatuses such as a computer is described.

Thus, the unit that a human can understand can be used for the GUI for displaying to the human. The device understanding unit can uniquely link between a language that a human can understand and a language that a device can understand, and thus a new function can be added without a previous API.

FIG. 37 is a view to illustrate an index information description used in the network connection apparatus according to this embodiment. Reference numeral (500) denotes a description content unit for expressing an entire portion in the index information description in which the content of the service on the network is described in the connection apparatuses connected to the network. Reference numeral (501) denotes a human understanding unit for a human to understand the content of the service. Reference numeral (502) denotes a device understanding unit in which the service input/output description that the network connection apparatus such as a computer etc. can understand.

For instance, as shown in FIG. 37, when the description content unit 500 shows "service", the human understanding unit 501 shows "printing", the device understanding unit 502 shows "input (image), output (document)", the content of the service is understood as a term "printing" for a human while the service is determined by a specification of the input/output relationship.

Conventionally, when API of the content of service is specified it had to be determined previously as to the method of printing what the printing service is and to whom the printing service is carried out. On the other hand, in the device of this embodiment, the method of "printing" is not notified and processing is carried out only by a simple input/output relationship. Furthermore, by linking between the description (input/output relationship) understandable for the apparatuses and the language understandable for a human, the method can be displayed to a human in such a language that can be understood by a human.

Thus, it is sufficient that the network connection apparatus is conscious of only the input/output relationship when a new service appears and it is not necessary to recognize the method. That is, with respect to a new service, even if the previous API is not formed previously, the additional function can be realized.

Figure 44:
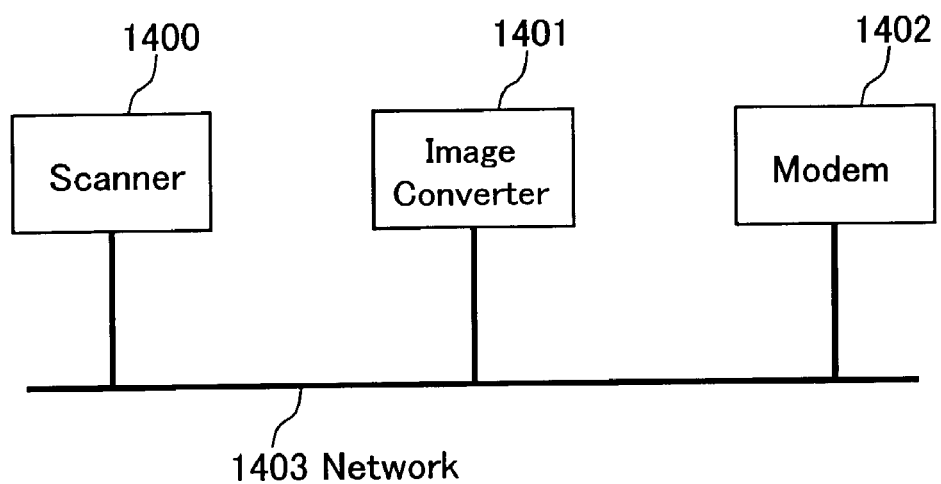
FIG. 44 is a block diagram showing a specific example of the network connection apparatus according to the ninth embodiment.
Figure 45:
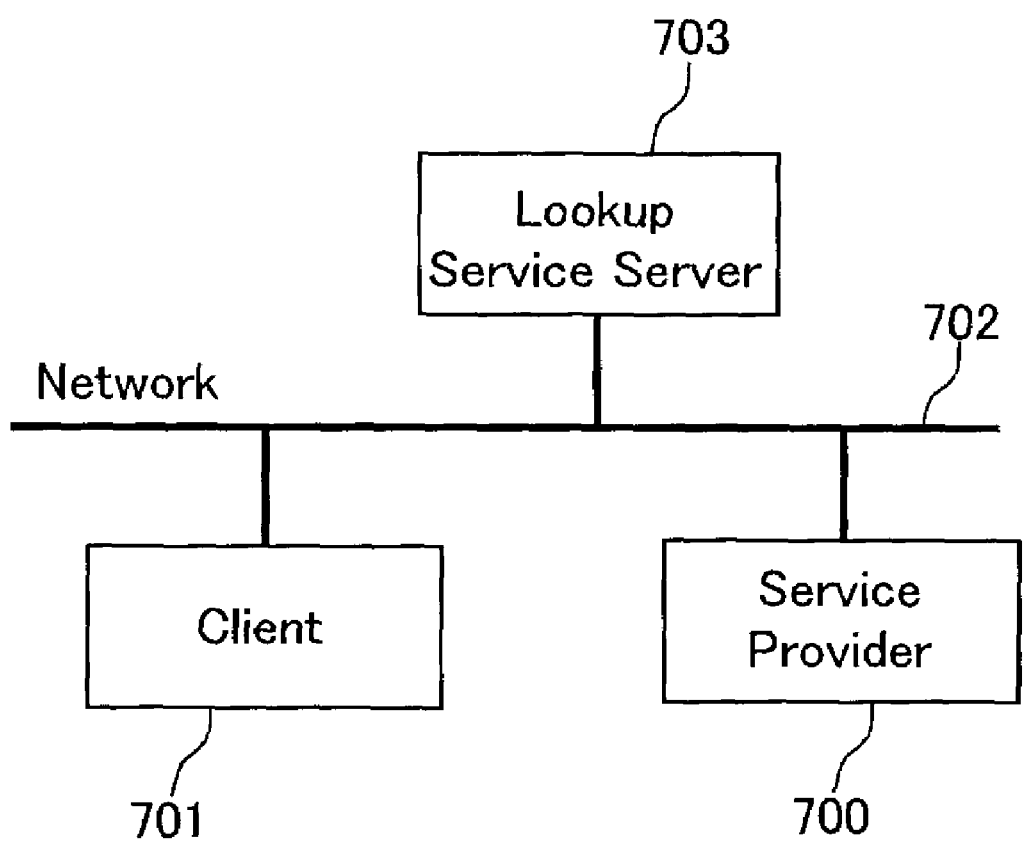
FIG. 45 is a view to illustrate an example of a configuration of a conventional network system.

Furthermore, by connecting a plurality of these services, a complicated new service can be provided. For example, as shown in FIG. 44, "input (document), output (bitmap)" is given to the description with respect to a scanner 1400; "input (bitmap), output (run-length encoding)" is given to the description with respect to an image converter 1401; and "input (run-length encoding), output (telephone line)" is given to the description with respect to the modem 1402, and by connecting these three services to each other, it is possible to realize a processing of format converting of an image (bitmap) captured by a network 1403 and of sending by FAX. Since these functions are run and managed by each network connection apparatus on an autonomous and dispersion basis, and thus such a collective management like a server is not needed.

As mentioned above, in this embodiment, in an index information description, by maintaining the human understanding unit 501 and the device understanding unit 502 with linked with each other, it is possible to provide a new service by each network connection apparatus without defining a new API.

INDUSTRIAL APPLICABILITY

As mentioned above, according to the present invention, it is possible to provide a network connection apparatus capable of connecting to the other network connection apparatuses easily without the need for a server and excellent in the expandability. Furthermore, by using this network connection apparatus, a network system excellent in expandability can be provided.

The invention claimed is:

1. A network connection apparatus connected to another network connection apparatus via a radio or a cable communication line to configure a network, the network connection apparatus comprising:

an interface unit for sending and receiving data via the communication line;

an apparatus information storing unit for storing function information of the network connection apparatus, the function information including a function of the network connection apparatus, format information on a format of contents to be input/output between the network and the network connection apparatus concerning the function, and size information on a size of the contents to be input/output from the network connection apparatus;

an apparatus information interpretation unit for interpreting received function information of the another network connection apparatus received by the interface unit; wherein the received function information includes received format information and received size information; and a service definition storing unit for storing service definition information defining a service, the service definition information including at least service format information on the format of cooperative contents to be input/output and service size information on the size of the cooperative contents, wherein the network connection apparatus, when it is connected to the network, notifies the another network connection apparatus connected to the network of the function information of the network connection apparatus stored in the apparatus information storing unit, via the interface unit, and the apparatus information interpretation unit determines to provide the service by determining that the format information included in the function information of the network connection apparatus and the received format information included in the received function information of the another network connection apparatus match to the service format information of the service definition information, and that the size information included in the function information of the network connection apparatus and the received size information included in the received function information of the another network connection apparatus conform to the service size information of the service definition information.

2. The network connection apparatus according to claim 1, wherein in the service format information of the service definition storing unit, the format of the cooperative contents to be input matches to the format of the cooperative contents to be output, and the size of the cooperative contents to be input matches the size of the cooperative contents to be output.

3. The network connection apparatus according to claim 1, wherein the service definition storing unit further stores service providing information on the service to be provided by an outside network via a gateway and protocol information on a protocol for obtaining the service, and when the gateway is connected to the network connection apparatus via the network, the apparatus information interpretation unit receives service providing information on a particular protocol for allowing the gateway to obtain the service from the outside network from the gateway, and determines whether the received service providing information matches to the protocol information of the service definition storing unit, thereby determining whether the service can be provided.

4. The network connection apparatus according to claim 3, wherein when the apparatus information interpretation unit judges that the service is unprovidable based on a mismatch of the format information, the apparatus information interpretation unit inquires of the gateway as to whether a converting service for converting a contents format is present in the outside network.

5. A network system comprising a plurality of network connection apparatuses that are connected at any time via a radio or a cable communication line, wherein each of the plurality of the network connection apparatus comprises an interface unit for sending and receiving data via the communication line, an apparatus information storing unit for storing function information, the function information including a function of the network connection apparatus, format information on a format of contents to be input/output between the network and the network connection apparatus concerning the function, and size information on a size of the contents, and a service definition storing unit for storing service definition information defining a service by at least service format information on the format of the cooperative contents to be input/output and service size information on the size of the cooperative contents, and an apparatus information interpretation unit for interpreting received information of another one of the plurality of the network connection apparatus received by the interface unit;

a new network connection apparatus comprises a corresponding interface unit, a corresponding apparatus information storing unit for storing corresponding function information and a corresponding apparatus information interpretation unit;

when the new network connection apparatus is connected to the network system, the corresponding interface unit of the new network connection apparatus notifies the plurality of the network connection apparatus previously connected to the network system of the corresponding function information stored in the corresponding apparatus information storing unit of the new network connection apparatus;

in each of the plurality of the network connection apparatus, the apparatus information interpretation unit interprets the notified information and recognizes that the new network connection apparatus is connected newly to the network system; and wherein the new network connection apparatus, when it is connected to the network, notifies the plurality of the network connection apparatus connected to the network of the corresponding function information of the new network connection apparatus stored in the corresponding apparatus information storing unit, via the corresponding interface unit, and the corresponding apparatus information interpretation unit determines to provide the service by determining that the format information included in the corresponding function information of the new network connection apparatus and format information included in the function information of the one of the plurality of the network connection apparatus match to the service format information of the service definition information, and determines that the size information included in the corresponding function information of the new network connection apparatus and size information included in the function information of the one of the plurality of the network connection apparatus conform to the service size information of the service definition information.

6. The network system according to claim 5, wherein in the service format information of the service definition storing unit, the format of the cooperative contents to be input matches the format of the cooperative contents to be output, and the size of the cooperative contents to be input matches to the size of the cooperative contents to be output.

7. The network system according to claim 5, wherein at least one of the network connection apparatuses is a gateway including an outside interface unit for exchanging data with an outside network, the service definition storing unit further stores service providing information on the service to be provided by the outside network via the gateway and protocol information on a protocol for obtaining the service, and the apparatus information interpretation unit receives service providing information on a particular protocol for allowing the gateway to obtain the service from the outside network from the gateway, and determines whether the received service providing information matches to the protocol information of the service definition storing unit, thereby determine whether the service can be provided.

8. The network system according to claim 7, wherein the gateway has information on a converting service for converting a contents format in the outside network, and when the apparatus information interpretation unit judges that the service is unprovidable based on a mismatch of the format information, the apparatus information interpretation unit inquires of the gateway as to whether the converting service for converting the contents format is present in the outside network.

* * * * *